United States Patent
Suzuki et al.

(10) Patent No.: US 6,285,684 B1
(45) Date of Patent: Sep. 4, 2001

(54) MOBILE COMMUNICATION SYSTEM, MOBILE TERMINAL, BASE STATION, MOBILE SWITCHING STATION AND MOBILE COMMUNICATION CONTROL METHOD

(75) Inventors: Norio Suzuki; Noriko Samejima, both of Kawasaki; Kazuhiko Tomita, Tachikawa; Keiji Kameyama, Tachikawa; Eiji Morita, Tachikawa, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/851,421

(22) Filed: May 5, 1997

(30) Foreign Application Priority Data

Oct. 30, 1996 (JP) .................................... 8-287893

(51) Int. Cl.$^7$ ................................ H04J 3/16; H04J 3/22
(52) U.S. Cl. ............................................ 370/471; 370/474
(58) Field of Search .................................. 370/394, 395, 370/397, 474, 466, 471, 338, 401, 331, 332, 473

(56) References Cited

U.S. PATENT DOCUMENTS

| | | | |
|---|---|---|---|
| 5,327,574 | * | 7/1994 | Monma et al. . |
| 5,390,366 | * | 2/1995 | Kasugai . |
| 5,420,863 | * | 5/1995 | Taketsugu et al. ................ 370/337 |
| 5,434,859 | * | 7/1995 | Levardon . |
| 5,590,125 | * | 12/1996 | Acampora et al. ................ 370/397 |
| 5,615,210 | * | 3/1997 | Kaiyama et al. . |
| 5,638,371 | * | 6/1997 | Raychaudhuri et al. . |
| 5,646,937 | * | 7/1997 | Nakano et al. . |
| 5,659,544 | * | 8/1997 | La Porta et al. ................... 370/312 |
| 5,774,461 | * | 6/1998 | Hyden et al. . |
| 5,793,752 | * | 8/1998 | Clarke et al. ..................... 370/252 |
| 5,812,636 | * | 9/1998 | Tseng et al. ...................... 455/443 |
| 5,873,030 | * | 2/1999 | Mechling et al. ................. 455/408 |
| 5,875,185 | * | 2/1999 | Wang et al. ....................... 370/331 |
| 5,883,888 | * | 3/1999 | St-Pierre .......................... 370/331 |
| 5,889,770 | * | 3/1999 | Jokiaho et al. ................... 370/337 |
| 5,889,816 | * | 3/1999 | Agrawal et al. .................. 386/52 |
| 5,896,568 | * | 4/1999 | Tseng et al. ...................... 370/337 |
| 5,901,352 | * | 5/1999 | St-Pierre et al. ................. 455/426 |
| 5,940,371 | * | 8/1999 | Mitts et al. ....................... 370/236 |
| 5,940,385 | * | 8/1999 | Mita et al. ........................ 370/349 |
| 5,966,378 | * | 10/1999 | Hamalainen ..................... 370/348 |
| 5,987,018 | * | 11/1999 | Freeburg et al. ................. 370/345 |
| 6,009,096 | * | 12/1999 | Jaisingh et al. .................. 370/395 |
| 6,014,654 | * | 1/2000 | Donis et al. ...................... 706/62 |
| 6,078,575 | * | 6/2000 | Dommety et al. ................ 370/338 |

* cited by examiner

*Primary Examiner*—Dang Ton
*Assistant Examiner*—Phirin Sam
(74) *Attorney, Agent, or Firm*—Helfgott & Karas, P.C.

(57) ABSTRACT

A mobile communication system includes a mobile terminal, a base station, and a mobile switching station. The mobile terminal, the base station and the mobile switching station are constructed so that communication information and control information are transferred by an asynchronous transfer mode (ATM) cell between the mobile terminal and the base station, between mobile switching station and the base station.

11 Claims, 18 Drawing Sheets

FIG. 19

53 (BETWEEN MS→BS)

| | | |
|---|---|---|
| | | 0 |
| | | 3 |
| PRIORITY | No. OF ACCUMULATED CELLS | 4 |
| | | 5 |

FIG. 20

54 TRANSMISSION MANAGEMENT TABLE

| MS No. | TRANSMISSION URGENCY |
|---|---|
| MS 1 | a |
| MS 2 | b |
| ⋮ | ⋮ |
| MS n | k |

MOBILE COMMUNICATION SYSTEM, MOBILE TERMINAL, BASE STATION, MOBILE SWITCHING STATION AND MOBILE COMMUNICATION CONTROL METHOD

BACKGROUND OF THE INVENTION

The present invention generally relates to mobile communication system, mobile terminals, base stations, mobile switching stations and mobile communication control method, and more particularly to a mobile communication system, a mobile terminal, a base station, a mobile switching station and a mobile communication control method which transfer information using asynchronous transfer mode (ATM) cells.

Various kinds of mobile communication systems are known which connect a mobile terminal such as a car telephone and a portable telephone to a base station via a radio line, and connect the base station and a mobile switching station via a wire line. The utilization efficiency of radio frequencies on the radio line is improved using frequency division or time division multiplexing. In such mobile communication systems, there are demands to further improve the system efficiency.

FIG. 1 is a system block diagram showing an example of a conventional mobile communication system. The mobile communication system shown in FIG. 1 includes mobile terminals (or stations) $101_1$ through $101_k$ such as car telephones and portable telephones, base stations $102_1$ through $102_m$, a mobile switching station (or center) 103, a general switched network 104, a base station controller 105, and general telephones 106.

The base stations $102_1$ through $102_m$ which connect to the mobile switching station, and the mobile terminals $101_1$ through $101_k$ which are mobile, are connected via radio channels respectively made up of a control channel and a plurality of communication channels. The base stations $102_1$ through $102_m$ cope with call information from the mobile switching station 103 and call the mobile terminals $101_1$ through $101_k$ using the control channel. In addition, the mobile terminals $101_1$ through $101_k$ can call using the control channel. The base stations $102_1$ through $102_m$ specify the communication channels between the base stations $102_1$ through $102_m$ and the mobile terminals $101_1$ through $101_k$ via the control channel. Talk information is transferred between the mobile terminals $101_1$ through $101_k$ and the base stations $102_1$ through $102_m$ by use of the specified communication channels.

In addition, a base station control station 105 controls registration of positions where the mobile terminals $101_1$ through $101_k$ are located, and when the mobile terminals $101_1$ through $101_k$ are called, controls the base stations $102_1$ through $102_m$ and the mobile switching station 103 by referring to a home memory (not shown) which registers the position of the mobile terminals $101_1$ through $101_k$, so as to call the mobile terminals $101_1$ through $101_k$ by use of the control channel. The functions of the base station control station 105 may be provided in the mobile switching station 103.

The base station control station 105 also collects and monitors intensities of received signals during communication between the mobile terminals $101_1$ through $101_k$ and the base stations $102_1$ through $102_m$. For example, if the mobile terminal $101_1$ moves during the communication and the received signal intensity of one base station $102_1$ decreases and the received signal intensity of another base station $102_2$ increases, the base station control station 105 sends an instruction to the mobile switching station 103 to switch from the base station $102_1$ having the decreased received signal intensity to the base station $102_2$ having the increased received signal intensity. The mobile switching station 103 switches the base stations in response to this instruction, and the switched base station $102_2$ instructs the mobile terminal $101_1$ to switch to a new communication channel. As a result, the communication channel is switched to the new communication channel, and the communication can be continued while the mobile terminal $101_1$ moves.

Conventionally, the radio channels between the base stations $102_1$ through $102_m$ and the mobile terminals $101_1$ through $101_k$ employ various multiplexing techniques in order to improve the utilization efficiency of the radio frequencies. Frequency division multiple access (FDMA), time division multiple access (TDMA), time division multiple access/time division duplex (TDMA/TDD) and code division multiple access (CDMA) are examples of such multiplexing techniques. Further, with respect to the data transfer, there is a known technique which transfers the data in packets.

According to the conventional mobile communication system, the mobile terminals $101_1$ through $101_k$ communicate by occupying the communication channels specified from the base stations $102_1$ through $102_m$, and the utilization efficiency of the radio frequencies can be improved by subjecting an audio signal to a band compression coding. However, the audio signal includes a relatively large amount of silent (or unvoiced) intervals, and the communication channels are occupied even during such silent intervals.

In addition, if the mobile stations $101_1$ through $101_k$ move among service areas of the base stations $102_1$ through $102_m$ during communication, the base stations $102_1$ through $102_m$ are switched and the communication channels are switched, thereby requiring a complex control so as not to interrupt the communication. As a result, there was a problem in that the load on the processes of the mobile switching station 103 and the base station control station 105 is extremely large.

SUMMARY OF THE INVENTION

Accordingly, it is a general object of the present invention to provide a novel and useful mobile communication system, a mobile terminal, a base station, a mobile switching station and a mobile communication control method, in which the problem described above is eliminated.

Another and more specific object of the present invention is to provide a mobile communication system, a mobile terminal, a base station, a mobile switching station and a mobile communication control method, which realize an efficient mobile communication using ATM cells.

Still another object of the present invention is to provide a mobile communication system comprising a mobile terminal, a base station, and a mobile switching station, where the mobile terminal, the base station and the mobile switching station are constructed so that communication information and control information are transferred by an asynchronous transfer mode (ATM) cell between the mobile terminal and the base station, between mobile switching station and the base station. According to the mobile communication system of the present invention, it is possible to facilitate common use of the same communication channels by a plurality of mobile terminals by compression coding or the like of the audio information. The switching of the base stations can be carried out in a simple manner by rewriting the base station number in the cell header part of the ATM cell. In addition, the communication between the mobile terminals via the base stations connected to different mobile switching stations can be continued by the ATM cells by rewriting the mobile switching station number in the cell header part of the ATM cell.

A further object of the present invention is to provide a mobile terminal for use in a mobile communication system including mobile terminals, base stations and mobile switching stations, comprising a radio transmitter/receiver part transmitting and receiving an asynchronous transfer mode (ATM) cell, an audio input/output part inputting and outputting audio information, a transmitting cell assembling part assembling the ATM cell from the audio information output from the audio input/output part and control information, and transferring the ATM cell to the radio transmitter/receiver part, a received cell disassembling part disassembling the ATM cell received by the radio transmitter/receiver part to restore audio information, and transferring the restored audio information to the audio input/output part, and a control processor controlling assembling and disassembling of the ATM cell in the transmitting cell assembling part and the received cell disassembling part, and controlling a transmission timing of the ATM cell from the radio transmitter/receiver. According to the mobile terminal of the present invention, it is possible to facilitate common use of the same communication channels by a plurality of mobile terminals by compression coding or the like of the audio information. The switching of the base stations can be carried out in a simple manner by rewriting the base station number in the cell header part of the ATM cell. In addition, the communication between the mobile terminals via the base stations connected to different mobile switching stations can be continued by the ATM cells by rewriting the mobile switching station number in the cell header part of the ATM cell.

Another object of the present invention is to provide a base station for use in a mobile communication system including mobile terminals, base stations and mobile switching stations, comprising a radio transmitter/receiver part transmitting and receiving an asynchronous transfer mode (ATM) cell, a relay transfer processor exchanging the ATM cell between the base station and the mobile switching station, a transmitting cell editing part forming an ATM cell for control with respect to the mobile terminal, and transferring the ATM cell from the relay transfer processor to the radio transmitter/receiver part, and a received cell processor adding information indicating a received signal intensity upon receiving the ATM cell to a cell header part of the ATM cell which is received by the radio transmitter/receiver part. According to the base station of the present invention, it is possible to facilitate common use of the same communication channels by a plurality of mobile terminals by compression coding or the like of the audio information. The switching of the base stations can be carried out in a simple manner by rewriting the base station number in the cell header part of the ATM cell. In addition, the communication between the mobile terminals via the base stations connected to different mobile switching stations can be continued by the ATM cells by rewriting the mobile switching station number in the cell header part of the ATM cell.

Still another object of the present invention is to provide a mobile switching station for use in a mobile communication system including mobile terminals, base stations and mobile switching stations, comprising an asynchronous transfer mode (ATM) cell switch switching the ATM cell between the mobile switching station and the base station depending on tag information in a cell header part of the ATM cell, a message box part, coupled between the ATM cell switch and a general switched network, assembling and disassembling the ATM cell, and a call controller controlling the message box part depending on a call control cell which is based on the ATM cell. According to the mobile switching station of the present invention, it is possible to facilitate common use of the same communication channels by a plurality of mobile terminals by compression coding or the like of the audio information. The switching of the base stations can be carried out in a simple manner by rewriting the base station number in the cell header part of the ATM cell. In addition, the communication between the mobile terminals via the base stations connected to different mobile switching stations can be continued by the ATM cells by rewriting the mobile switching station number in the cell header part of the ATM cell.

A further object of the present invention is to provide a mobile communication control method which controls communication in a mobile communication system including mobile terminals, base stations and mobile switching stations, comprising the steps of transferring call control information and audio information between the mobile terminal and the base station by an ATM cell via a radio channel, transferring the call control information and the audio information by the ATM cell between the base station and the mobile switching station and between the mobile switching stations, and switching the ATM cell in the mobile switching station depending on tag information in a cell header part of the ATM cell. According to the mobile communication control method of the present invention, it is possible to facilitate common use of the same communication channels by a plurality of mobile terminals by compression coding or the like of the audio information. The switching of the base stations can be carried out in a simple manner by rewriting the base station number in the cell header part of the ATM cell. In addition, the communication between the mobile terminals via the base stations connected to different mobile switching stations can be continued by the ATM cells by rewriting the mobile switching station number in the cell header part of the ATM cell.

Other objects and further features of the present invention will be apparent from the following detailed description when read in conjunction with the accompanying drawings.

BRIEF DESCRIPTION OF THE DRAWINGS

FIG. 19 is a diagram showing a priority and an accumulated number of cells added to a header part of the ATM cell; and FIG. 20 is a diagram showing a transmission management table.

DESCRIPTION OF THE PREFERRED EMBODIMENTS

Figure 1:
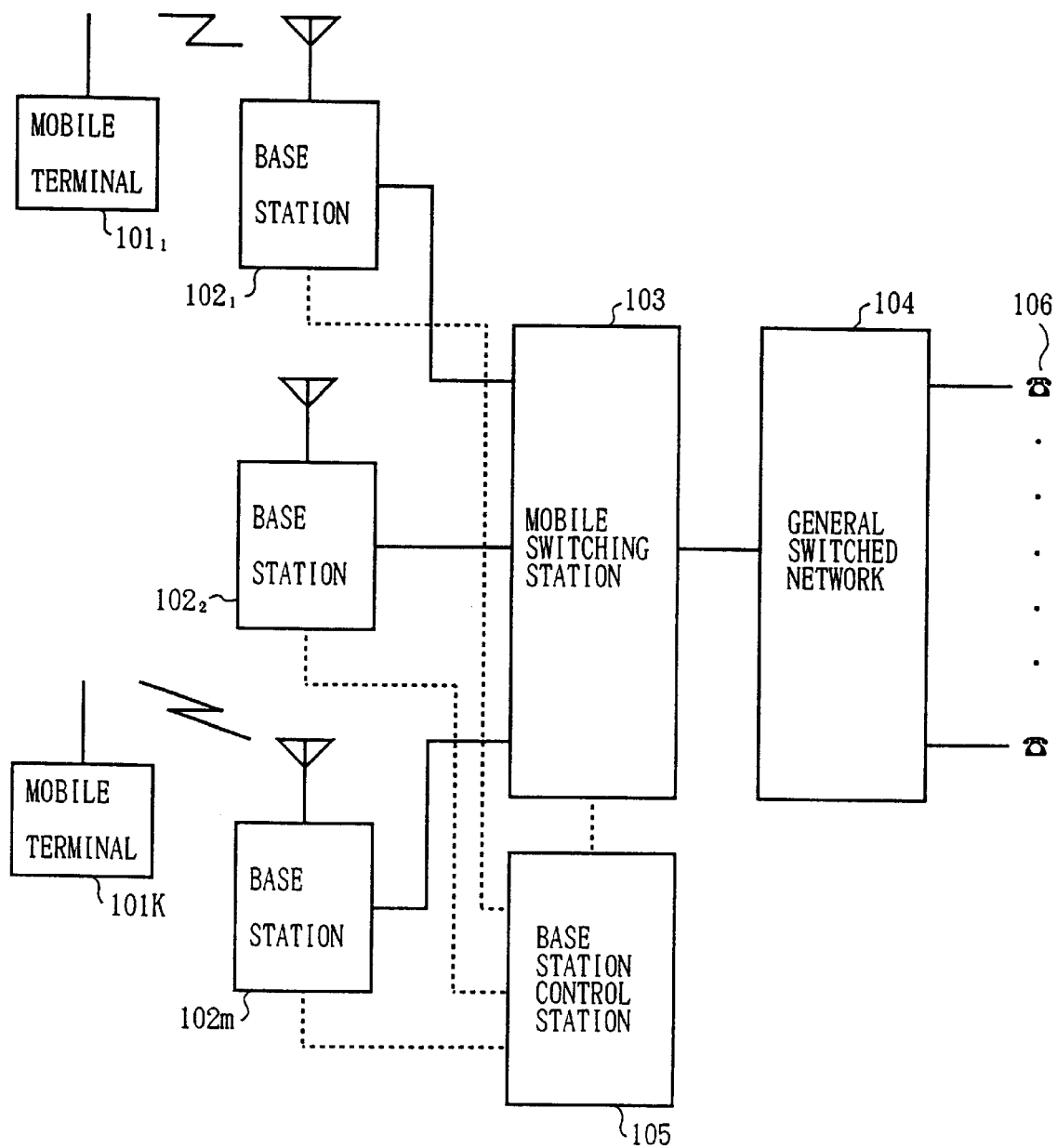
FIG. 1 is a system block diagram showing an example of a conventional mobile communication system.
Figure 2:
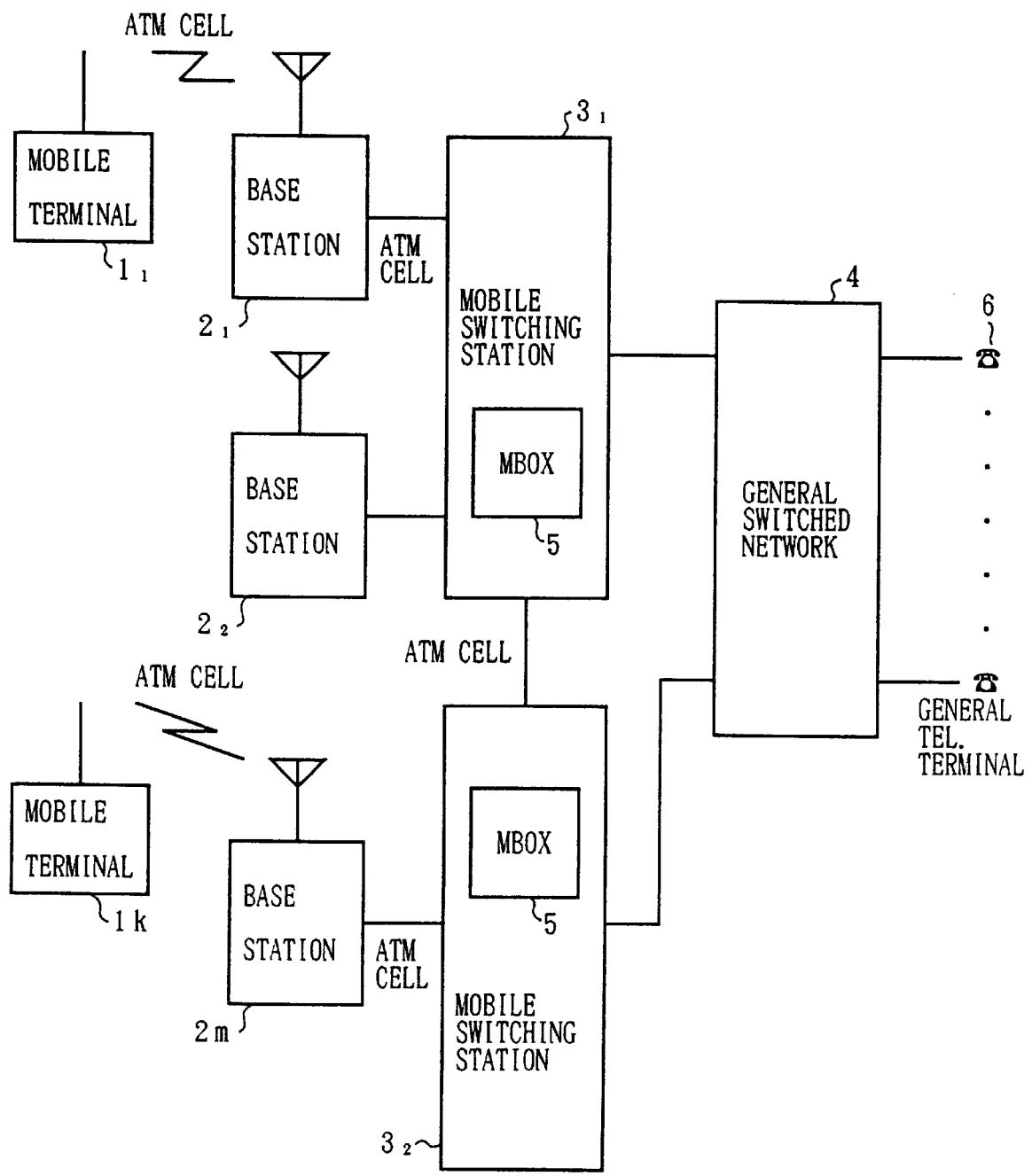
FIG. 2 is a system block diagram showing an embodiment of a mobile communication system according to the present invention.

FIG. 2 is a system block diagram showing an embodiment of a mobile communication system according to the present invention. The mobile communication system shown in FIG. 2 includes mobile terminals $1_1$ through $1_k$, base stations $2_1$ through $2_m$, mobile switching stations $3_1$ and $3_2$, a general switched network 4, and general telephone terminals 6. A message box part 5 is provided in each of the mobile switching stations $3_1$ and $3_2$. ATM cells are transferred between the mobile terminals $1_1$ through $1_k$ and the base stations $2_1$ through $2_m$, between the base stations $2_1$ through $2_m$ and the mobile switching stations $3_1$ and $3_2$, and between the mobile switching stations $3_1$ and $3_1$. In other words, the ATM cells are transferred between the mobile switching stations $3_1$ and $3_2$ when the mobile switching station is switched depending on the communication between the mobile terminals or depending on the movement of the mobile terminal.

The ATM cells have a construction which is approximately the same as the known ATM cell used in a broad band integrated services digital network (B-ISDN), and a cell header part is added to a 48-byte information part. For example, the header part is made up of 6 bytes, and includes a mobile switching station number and a message box number corresponding to a virtual path identifier (VPI) and a virtual channel identifier (VCI), a base station number of the base station which relays the ATM cells and a mobile switching station number which accommodates this base station, a received signal intensity at this base station, a cell number indicating the order of the ATM cells, and the like. On the other hand, the information part includes a signal type such as "call-out", audio information, control information and the like. The message box parts 5 are assigned at the start of the communication of the mobile terminals $1_1$ through $1_k$, and the ATM cells are transferred via the message box parts 5.

It is also possible to construct the system so that the ATM cells are transferred between the mobile switching stations $3_1$ and $3_2$ and the general switched network 4, but when applied to the existing system, the transfer is made after conversion into an analog audio signal, a pulse code modulation (PCM) audio signal or the like. In this case, the message box part 5 in each of the mobile switching stations $3_1$ and $3_2$ is provided with the function of assembling and disassembling the ATM cells.

Figure 3:
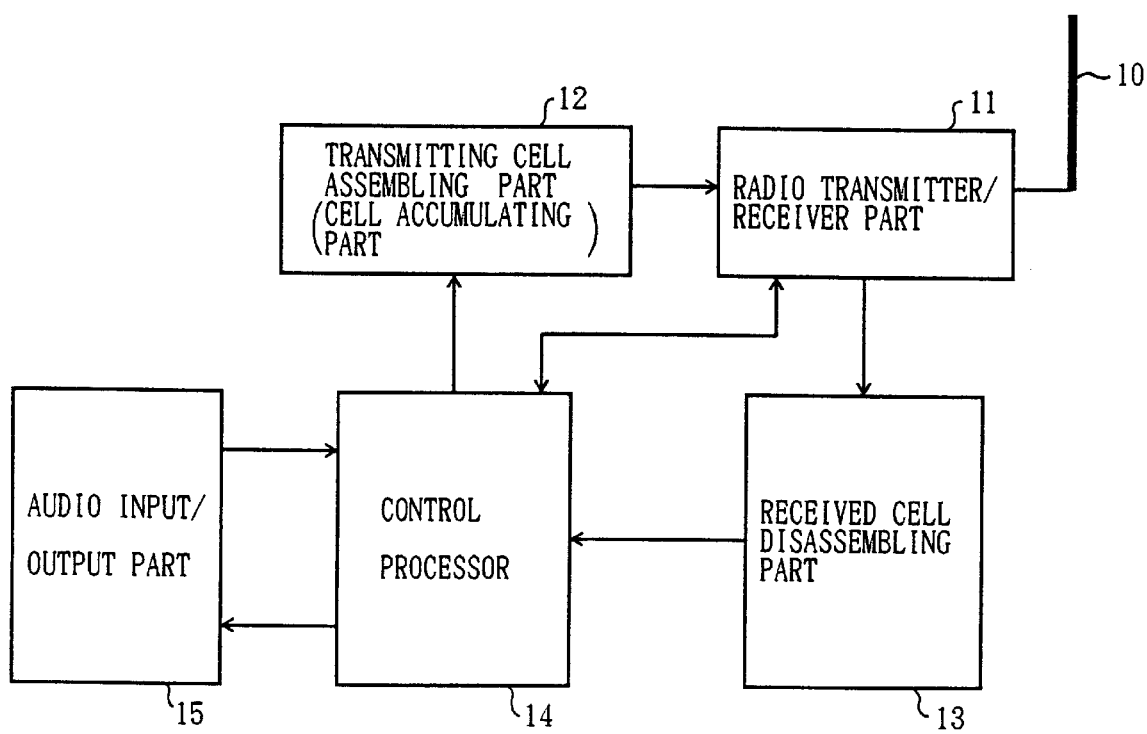
FIG. 3 is a system block diagram showing a part of an embodiment of a mobile terminal according to the present invention.

FIG. 3 is a system block diagram showing a part of an embodiment of a mobile terminal according to the present invention. The mobile terminal shown in FIG. 3 includes an antenna 10, a radio transmitter/receiver part 11, a transmitting cell assembling part 12, a received cell disassembling part 13, a control processor 14, and an audio input/output part 15. A handset, a manipulation part such as dial-buttons, a call display part and the like can be constructed similarly to those of a portable telephone, and an illustration thereof is omitted in FIG. 3.

An input audio signal is subjected to a compression coding in the audio input/output part 15 or the control processor 14. Coded audio information is transferred to the transmitting cell assembling part 12 which assembles the ATM cells by inserting the audio information in the information part and the base station number or the like is inserted in the cell header part. The ATM cells are modulated to a radio frequency of several hundred MHz to several GHz by the radio transmitter/receiver part 11 and transmitted via the antenna 10.

On the other hand, the ATM cells are received by the antenna 10 and demodulated in the radio transmitter/receiver part 11. In the radio transmitter/receiver part 11 or the received cell disassembling part 13 judges from the cell header part of the demodulated ATM cell, whether or not the ATM cell is addressed to the mobile terminal to which the radio transmitter/receiver part 11 or the received cell disassembling part 13 belongs. If the ATM cell is addressed to the mobile terminal to which the radio transmitter/receiver part 11 or the received cell disassembling part 13 belongs, the ATM cell is disassembled in the received cell disassembling part 13, and the audio information is restored into the audio signal in the control processor 14 or the audio input/output part 15.

Figure 4:
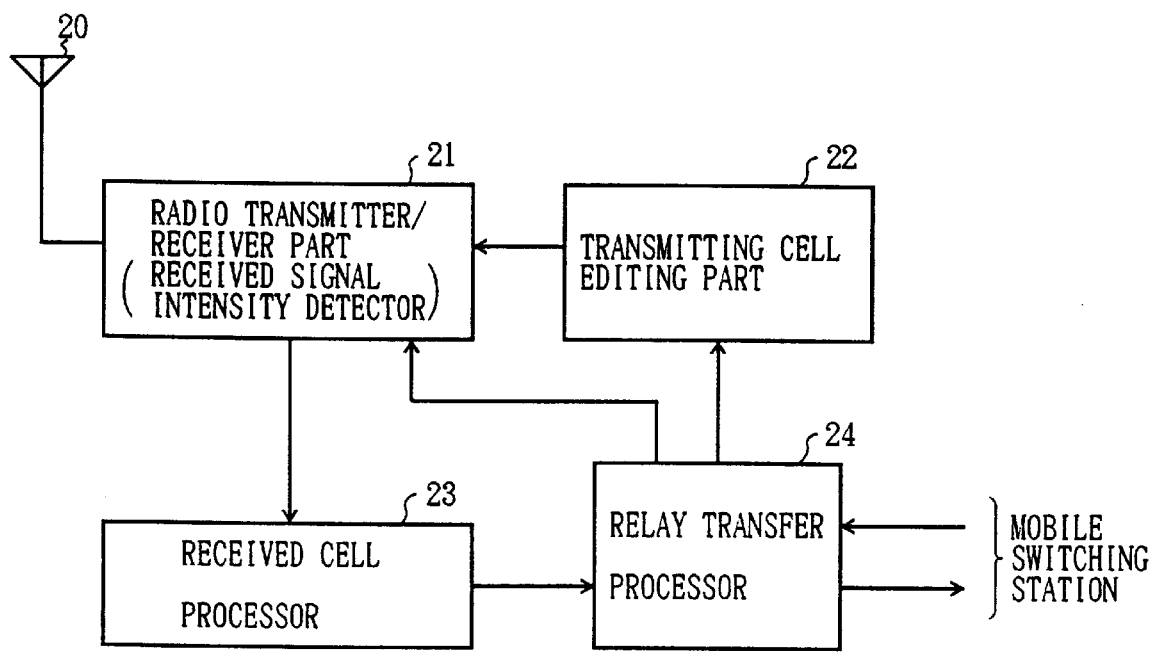
FIG. 4 is a system block diagram showing a part of an embodiment of a base station according to the present invention.

FIG. 4 is a system block diagram showing a part of an embodiment of a base station according to the present invention. The base station shown in FIG. 4 includes an antenna 20, a transmitter/receiver part 21, a transmitting cell editing part 22, a received cell processor 23, and a relay transfer processor 24. The base station is connected to the mobile switching station via the relay transfer processor 24 and transfer the ATM cells.

The radio transmitter/receiver part 21 includes a received signal intensity detector which receives the signal from the mobile terminal which calls out or is communicating and detects the received signal intensity, and transfers the detected received signal intensity to the received cell processor 23. The ATM cells from the mobile terminal which are modulated to the radio frequency of several hundred MHz to several GHz are received by the antenna 20 and demodulated in the radio transmitter/receiver part 21. The demodulated ATM cells are transferred to the received cell processor 23. The ATM cells from the transmitting cell editing part 22 are modulated to the radio frequency in the radio transmitter/receiver part 21, and are transmitted from the antenna 20.

The received cell processor 23 writes the received signal intensity which is detected by the received signal intensity detector of the radio transmitter/receiver part 21 into the cell header part of the ATM cell, and transfers the ATM cell to the relay transfer processor 24. The relay transfer processor 24 transfers the ATM cells to the mobile switching station, and transfers the ATM cells transferred from the mobile switching stations to the transmitting cell editing part 22.

Figure 5:
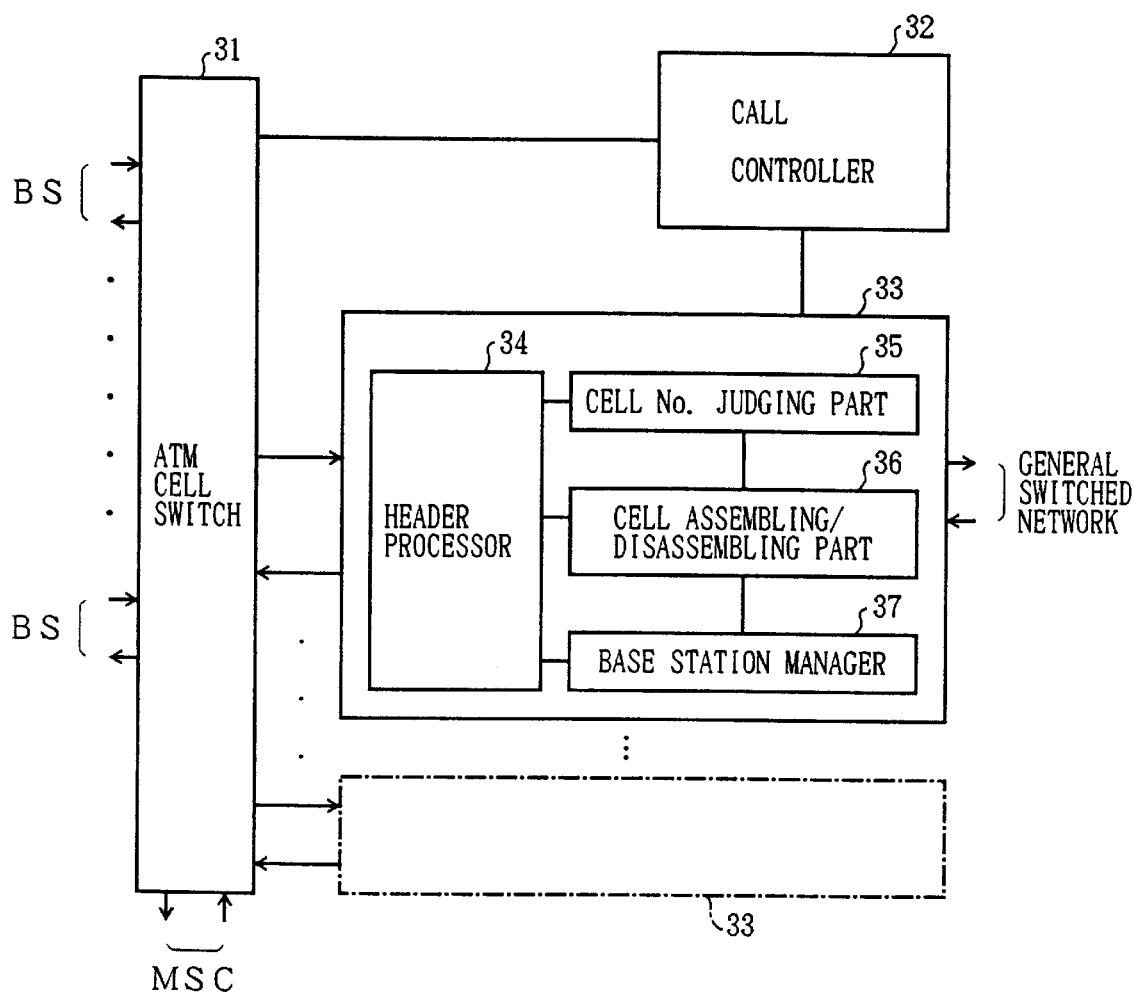
FIG. 5 is a system block diagram showing a part of an embodiment of a mobile switching station according to the present invention.

FIG. 5 is a system block diagram showing a part of an embodiment of a mobile switching station according to the present invention. The mobile switching station shown in FIG. 5 includes an ATM cell switch 31, a call controller 32, message box parts 33, a header processor 34, a cell number judging part 35, a cell disassembling/assembling part 36, and a base station manager 37. In FIG. 5, BS denotes a base station, and MSC denotes another mobile switching station.

Each message box part 33 includes the header processor 34, the cell number judging part 35, the cell disassembling/assembling part 36, and the base station manager 37. Although only two message box parts 33 are shown in FIG. 5, the number of message box parts 33 that are provided depends on the number of base stations BS, the maximum number of simultaneous communication from the mobile terminals and the like. The message box part 33 is connected between the ATM cell switch 31 and the general switched network which accommodates the general telephone terminals, and is assigned at the start of the communication of the mobile terminal. The ATM cell switch 31 carries out a self-routing of the ATM cells between the base station BS and the message box part 33 or, between the base station BS and the other mobile switching station MSC, based on tag information in the cell header part of the ATM cell. The call controller 32 includes a call control function including control associated with the call-out and call-in of the mobile terminal, an accounting function, an authentication function of the mobile terminal and the like.

Figure 6:
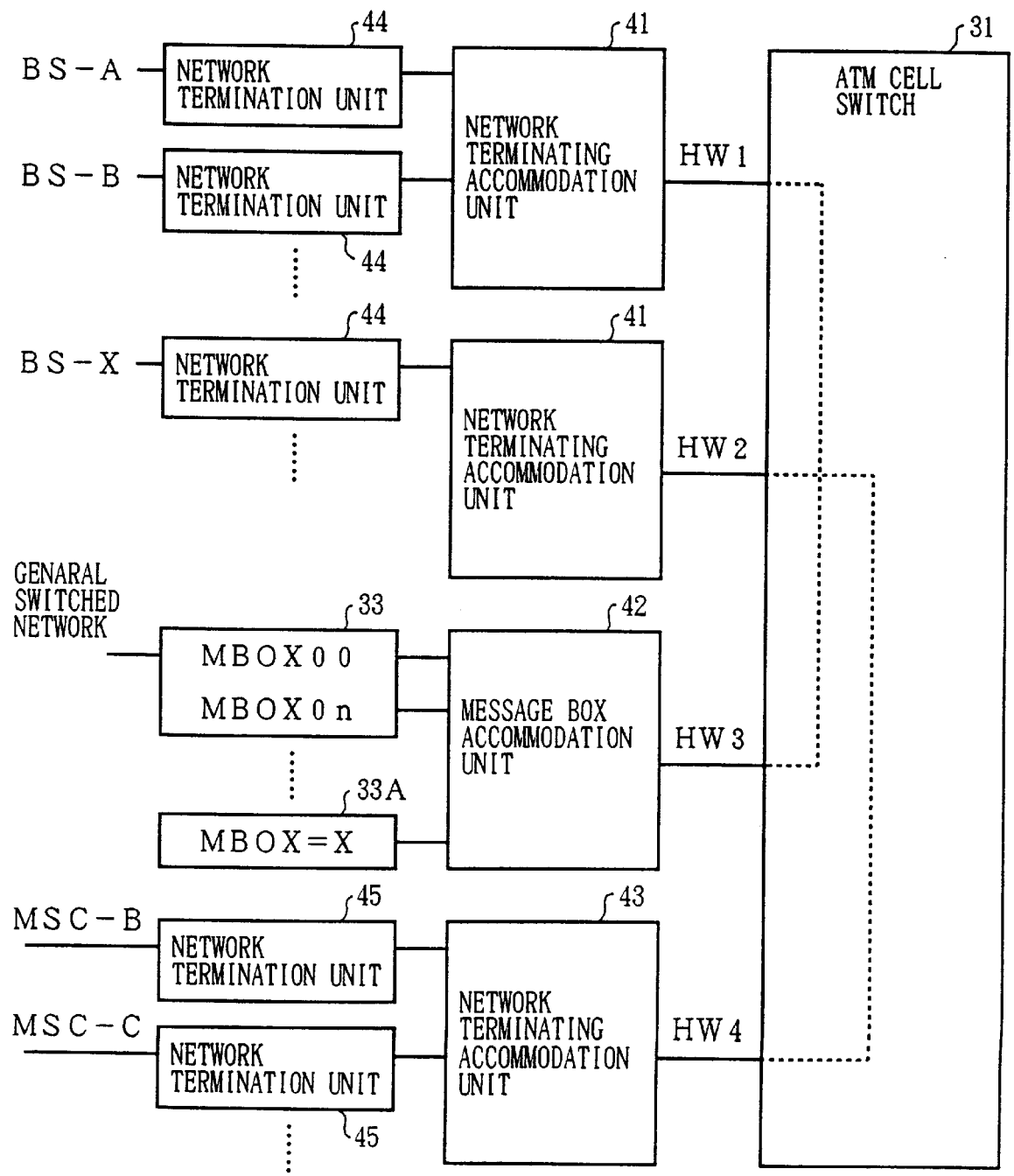
FIG. 6 is a system block diagram for explaining a line accommodating structure of the embodiment of the mobile switching station.

FIG. 6 is a system block diagram showing for explaining a line accommodating structure of the embodiment of the mobile switching station. FIG. 6 shows a network terminating accommodation unit 41, a message box accommodation unit 42, a network terminating accommodation unit 43, network termination units 44 and 45, the ATM cell switch 31, the communication message box part 33 (MBOX00 through MBOX0n) for communication, a call control message box part 33A (MBOX=X) for call control, and highways HW1 through HW4. In this case, it is assumed for the sake of convenience that the message box part 33 includes a plurality of message boxes MBOX00 through MBOX0n.

Base stations BS-A, BS-B, . . . , BS-X are respectively connected to the network termination units 44, and a predetermined number of network termination units 44 are accommodated in one network terminating accommodation unit 41. Other mobile switching stations MSC-B, MSC-C, . . . are respectively connected to the network termination units 45, and the network termination units 45 are accommodated in the network terminating accommodation unit 43. The general switched network is connected to the communication message box part 33. The communication message box part 33 and the call control message box part 33A are accommodated in the message box accommodation unit 42.

The network terminating accommodation units 41 and 43 and the message box accommodation unit 42 include the function of multiplexing and demultiplexing and the function of generating the tag information for self-routing of the ATM cell switch 31 and adding the tag information to the cell header part. When making the call-out from the mobile terminal, a call accept process is carried out using the message box part number of the call control message box part 33A, and after this call accept process, one of the message boxes MBOX00 through MBOX0n of the communication message box part 33 is assigned 1:1 with respect to the mobile terminal. In addition when making a call-out from the general telephone network to the mobile terminal, one of the message boxes MBOX00 through MBOX0n of the communication message box part 33 with respect to the general telephone is assigned 1:1 with respect to the mobile terminal.

FIGS. 7 through 11 respectively are diagrams showing the formats of the ATM cells.

Figure 7:
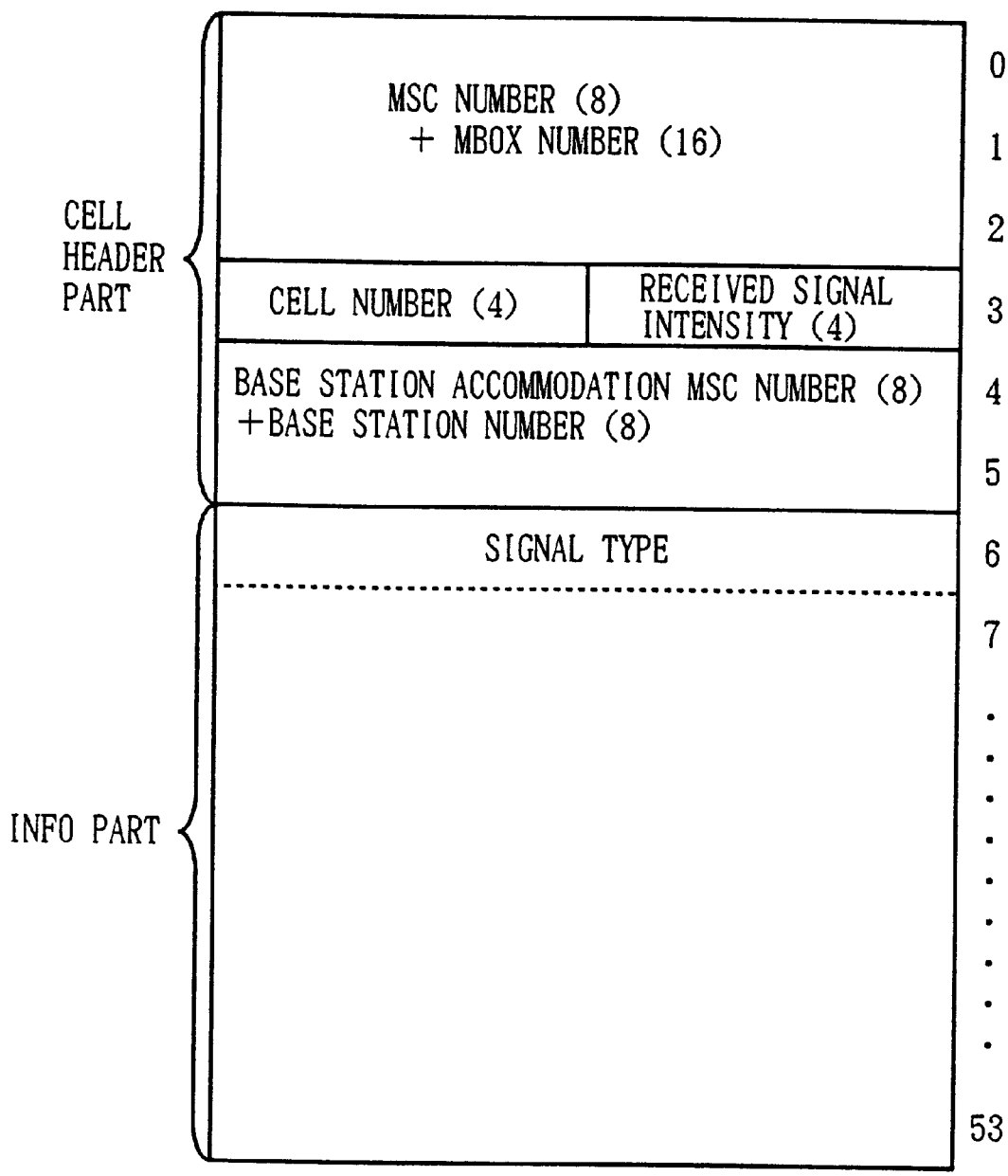
FIG. 7 is a diagram for explaining the format of an ATM cell.

FIG. 7 shows an ATM cell (A) having a basic structure. The ATM cell (A) shown in FIG. 7 includes a 48-byte information part, and a 6-byte cell header part. The cell header part includes regions of an 8-bit mobile switching station number (MSC number) and a 16-bit message box number (MBOX number), a 4-bit cell number, a 4-bit received signal intensity, and an 8-bit base station accommodating MSC number and an 8-bit base station number. On the other hand, the information part includes regions of the signal type indicative of the cell type such as "call-out", audio information, and control information.

In the region of bytes 0 to 2 of the cell header part, the MBOX number is the communication message box number assigned to the communication of the mobile terminal, and the MSC number is the mobile switching station number of the mobile switching station having the message box with the MBOX number. In the region of a byte 3 of the cell header part, the cell number is the number indicating the order of the ATM cell, and the received signal intensity indicates the intensity of the signal from the mobile terminal received at the base station. In the region of bytes 4 and 5 of the cell header part, the base station number is the base station number of the base station the mobile terminal is communicating with, and the base station accommodating MSC number is the mobile switching station number of the mobile switching station which accommodates the base station. Accordingly, the MBOX number which is assigned at the start of the communication of the mobile terminal and the MSC number are maintained until the end of the communication, and the base station number or the base station accommodating MSC number is updated as the mobile terminal moves. The message box indicated by the MBOX number is connected to the general telephone terminal via the general switched network. The ATM cells from the message box with respect to the mobile terminal are transferred in correspondence with the base station number and the base station accommodating MSC number which are updated as the mobile terminal moves.

Figure 8:
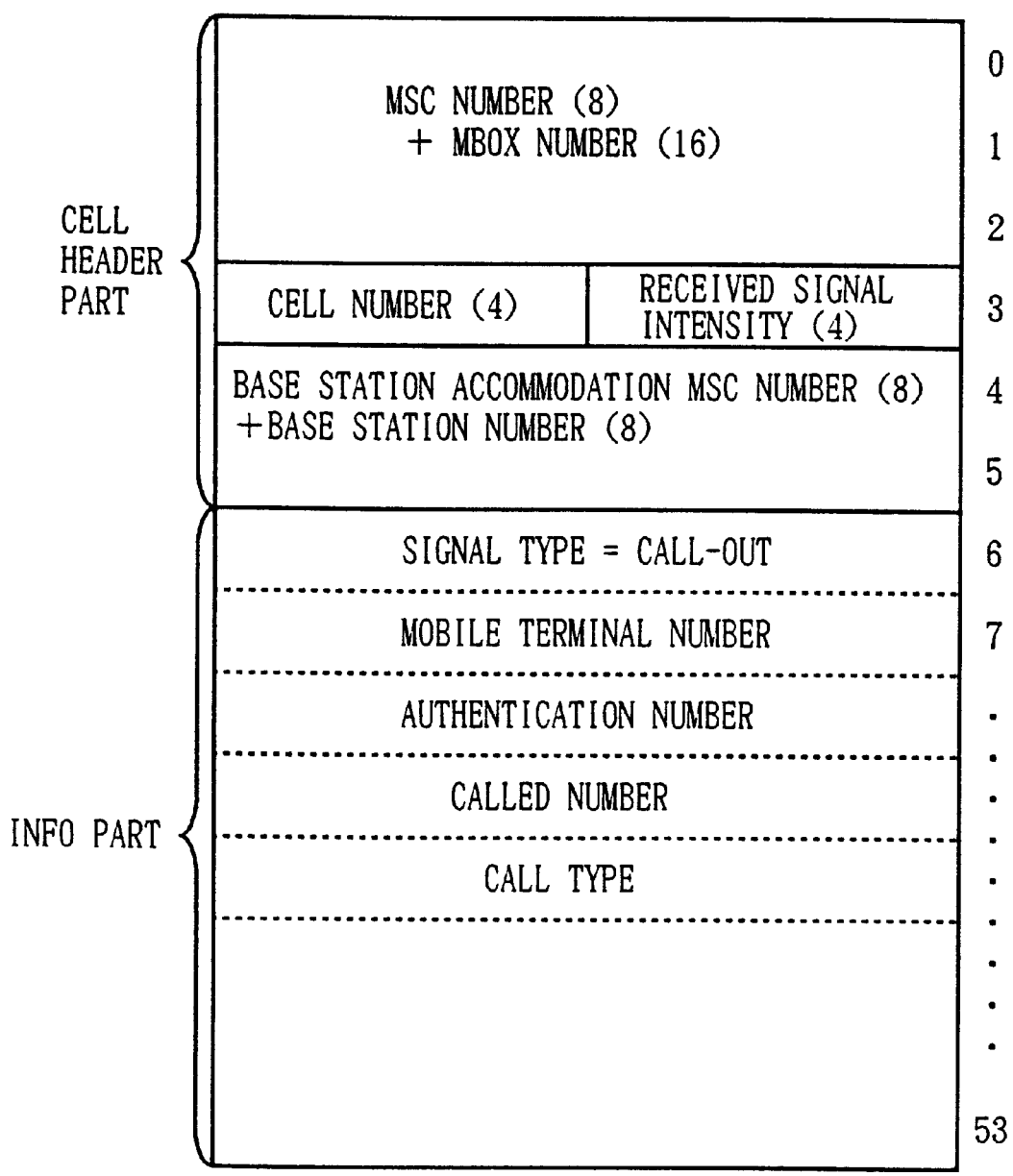
FIG. 8 is a diagram for explaining the format of a call-out cell.

FIG. 8 shows a call-out cell (B). The mobile terminal can identify the base station number from the simultaneous broadcasts from the base stations within the service areas to which the location of the mobile terminal belongs. Hence, when making the call-out, the cell number and the base station number are written in the cell header part of the ATM cell. In addition, the signal type which is "call-out"in this case, the mobile terminal number which indicates the mobile terminal which makes the call-out, the authentication number, the called number which indicates the other party, the call type and the like are written in the information part of the ATM cell. Such processes are carried out by controlling the transmitting cell assembling part 12 from the control processor 14 shown in FIG. 3, and the call-out cell (B) is transmitted from the radio transmitter/receiver part 11. In this case, the region of the MSC number and the MBOX number and the region of the received signal intensity are empty.

The base station receives the call-out cell (B) by the radio transmitter/receiver part 21 shown in FIG. 4, and detects the received signal intensity by the received signal intensity detector. The received cell processor 23 writes the received signal intensity in the cell header part of the ATM cell, and the call-out cell (B) is transferred to the mobile switching station via the relay transfer processor 24.

The mobile switching station transfers the call-out cell (B) to the call controller 32 via the ATM cell switch 31 shown in FIG. 5, and identifies the call-out cell (B) from the signal type included in the information part of the ATM cell. In addition, the mobile switching station authenticates whether or not the mobile terminal which made the call-out is a legitimate mobile terminal. If the mobile terminal which made the call-out is a legitimate mobile terminal, the message box part 33 is assigned based on the called number, and the other party is called by transmitting the call-out information which includes the called number from the message box part 33 to the general switched network.]

Figure 9A:
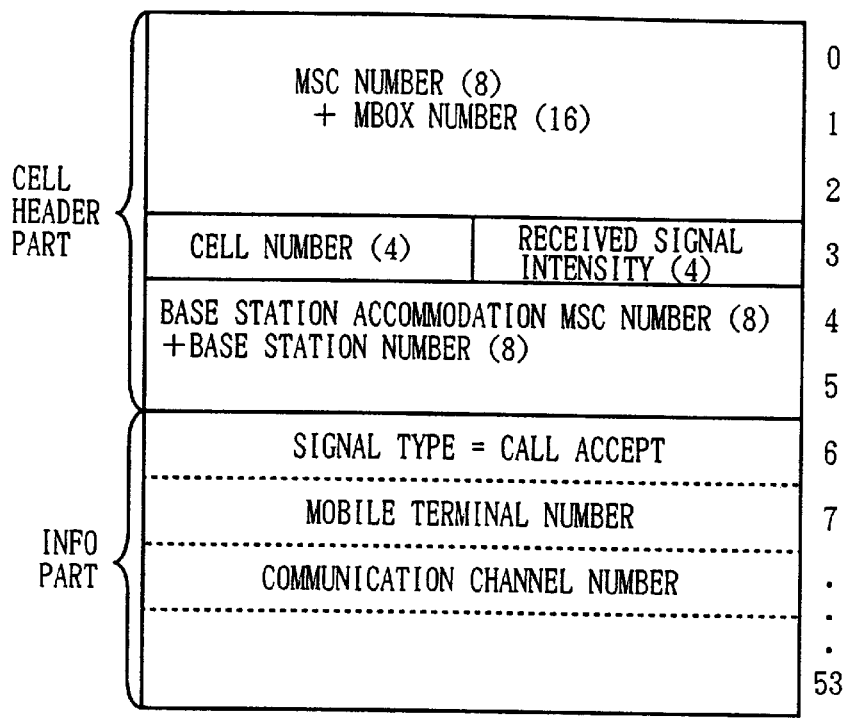
FIGS. 9A and 9B respectively are diagrams for explaining formats of a call accept cell and a respond cell.
Figure 9B:
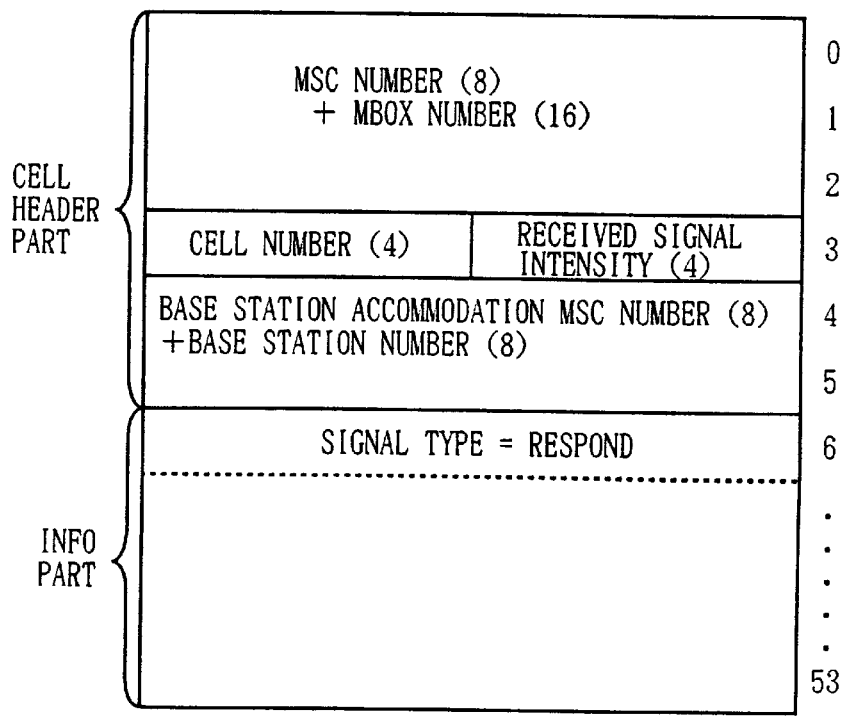

FIG. 9A shows a call accept cell (C) with respect to the call-out cell (B) shown in FIG. 8, and FIG. 9B shows a respond cell (D) with respect to the call-out cell (B).

The call accept cell (C) shown in FIG. 9A is transferred by writing the mobile switching station number of the mobile switching station which carried out the call accept process and assigned the communication message box part 33 as described above in conjunction with FIGS. 5 and 6 and the message box number of this communication message box part 33 in the region of the MSC number and the MBOX number in the cell header part. In addition, the cell number, the base station number and the mobile switching station number of the mobile switching station which accommodates this base station are also written in the cell header part of the call accept cell (C) upon transfer thereof. On the other hand, the signal type which is "call accept"in this case, the mobile terminal number, and the communication channel number allocated to the mobile terminal are written in the information part of the call accept cell (C) upon transfer thereof.

The respond cell (D) shown in FIG. 9B is transmitted to the mobile terminal which made the call-out in response to the call-out cell (C), from the mobile switching station via the base station. The contents of the cell header part of the respond cell (D) are the same as those of the call-out cell (C). In the information part of the respond cell (D), "respond"is written as the signal type.

Figure 10A:
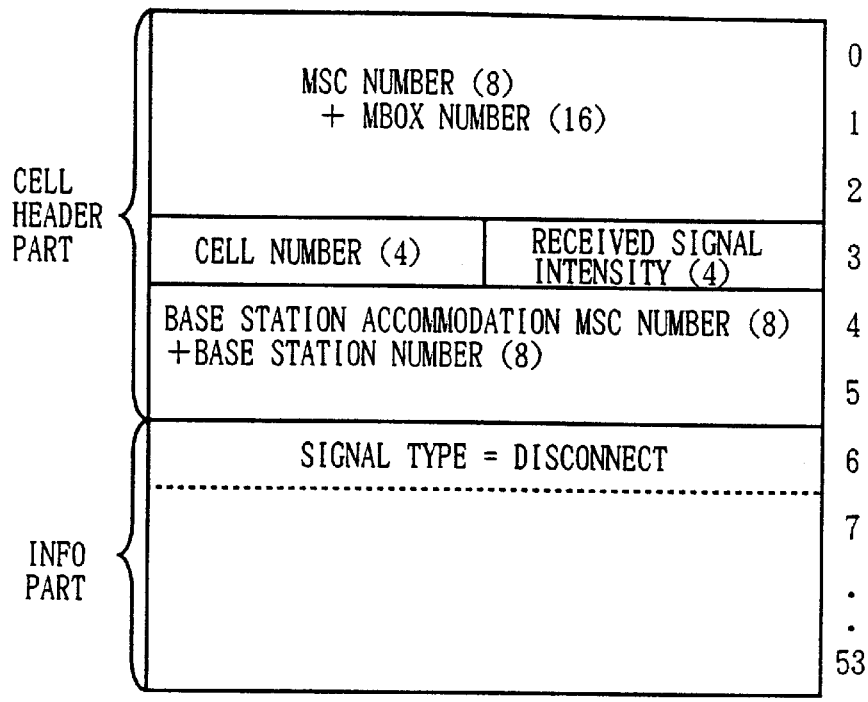
FIGS. 10A and 10B respectively are diagrams for explaining the formats of a disconnect cell and a disconnect confirmation cell.
Figure 10B:
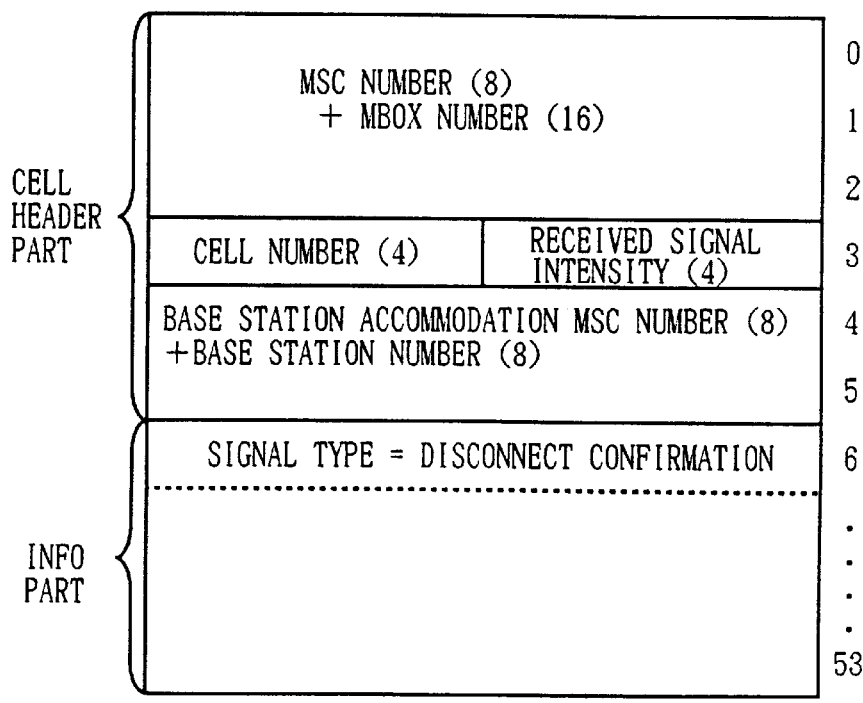

FIG. 10A shows a disconnect cell (E), and FIG. 10B shows a disconnect confirmation cell (F).

The contents of the cell header part of the disconnect cell (E) shown in FIG. 10A are the same as those of the respond cell (D). In the information part of the disconnect cell (E), "disconnect"is written as the signal type.

The contents of the cell header of the disconnect confirmation cell (F) shown in FIG. 10B are the same as those of the disconnect cell (E). In the information part of the disconnect confirmation cell (F), "disconnect confirmation"is written as the signal type.

Figure 11:
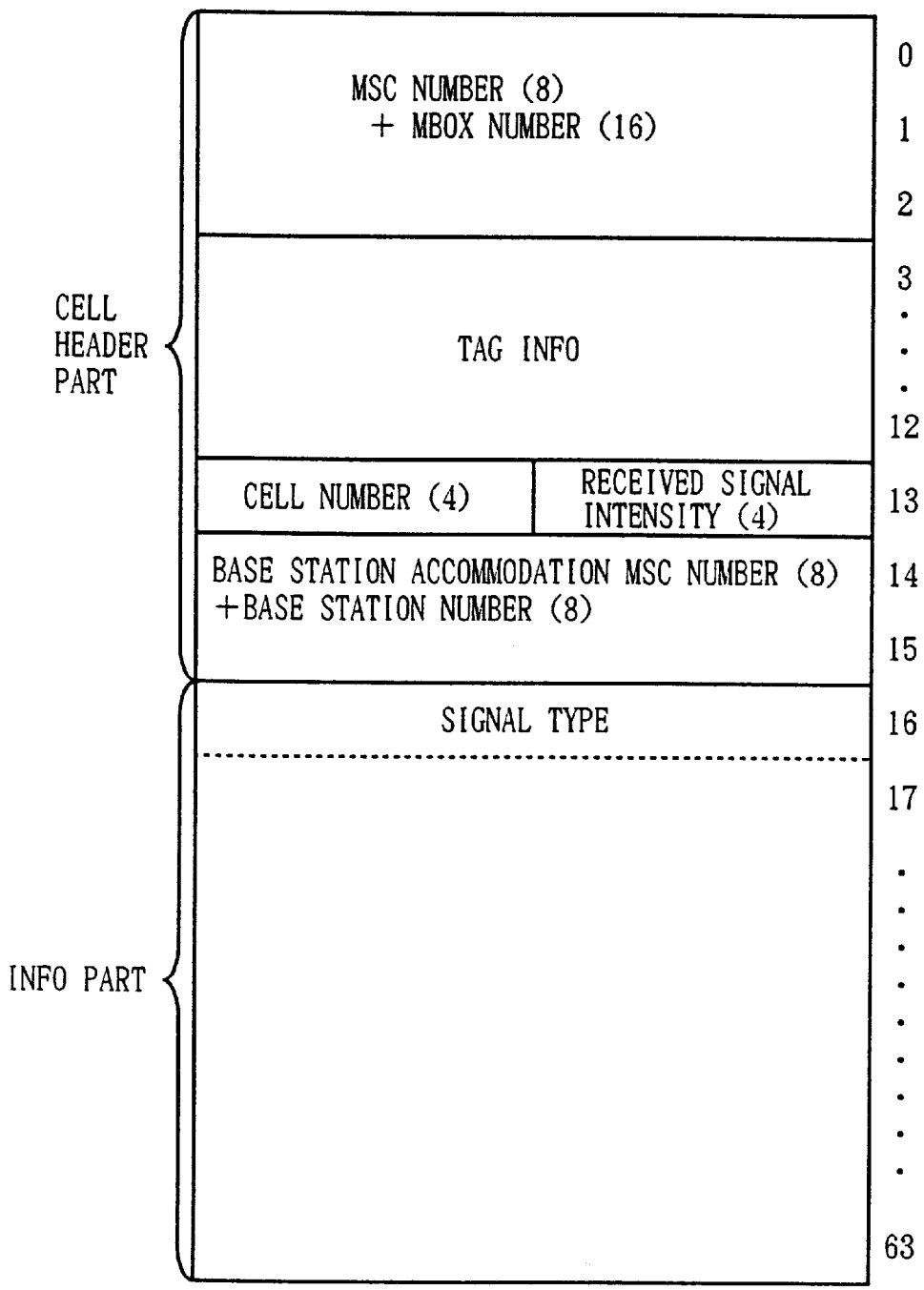
FIG. 11 is a diagram for explaining the format of an ATM cell within the mobile switching station.

FIG. 11 shows an ATM cell (G) within the mobile switching station. FIG. 11 shows a case where a 10-byte tag information, which indicates that the cell is the ATM cell (G) within the mobile switching station, is added to the cell header part of the ATM cell (A) having the basic structure, so as to form the ATM cell (G). Hence, the ATM cell (G) has a 16-byte cell header part. of course, the number of bytes of the tag information included in the cell header part of the ATM cell (G) may be varied depending on the scale of the mobile switching station.

The tag information in the cell header part of the ATM cell (G) has a structure dependent on the number of terminals, the number of stages of switches and the like in the ATM cell switch 31 of the mobile switching station. This tag information is formed in the network terminating accommodation units 41 and 43 and the message box accommodation unit 42 shown in FIG. 6, and is inserted next to byte 4 of the cell header part of the ATM cell (A) having the basic structure. The tag information may have a structure similar to that of tag information which is used for self-routing in the general ATM switching system.

For example, with respect to the ATM cell on an up-line from the mobile terminal to the mobile switching station, in the case of the mobile switching station which accommodates the base station with which the mobile terminal is communicating, the MSC number of the cell header part indicates this mobile switching station. Based on the MBOX number which is added to the MSC number, it is possible to obtain tag information having a bit pattern for carrying out the self-routing from an input terminal side to an output terminal side depending on the number of stages of the ATM cell switch 31, where the output terminal side is the highway HW3 of the message box accommodation unit 42 accommodating the message box part 33. If the MSC number indicates another mobile switching station, it is possible to obtain tag information having a bit pattern for carrying out the self-routing from the input terminal side to the output terminal side, where the output terminal side is the highway HW4 of the network terminating accommodation unit 43 accommodating the network termination unit 45 which is connected to the other mobile switching station.

On the other hand, with respect to the ATM cell on a down-line from the mobile switching station to the mobile terminal, if the MSC number indicates this mobile switching station, it is possible to obtain tag information having a bit pattern for carrying out the self-routing based on the base station number in bytes 14 to 15 of the cell header part of the ATM cell (G) shown in FIG. 11. In addition, if the MSC number indicates another mobile switching station, it is possible to obtain tag information having a bit pattern for carrying out the self-routing based on the base station accommodating MSC number in bytes 14 to 15 of the cell header part of the ATM cell (G) shown in FIG. 11. Accordingly, when the region of the base station accommodating MSC number and the base station number is updated as the mobile terminal moves, it is possible to transfer the ATM cells between the mobile switching station having the message box part 33 and the mobile switching station which accommodates the base station with which the mobile terminal is communicating.

Figure 12:
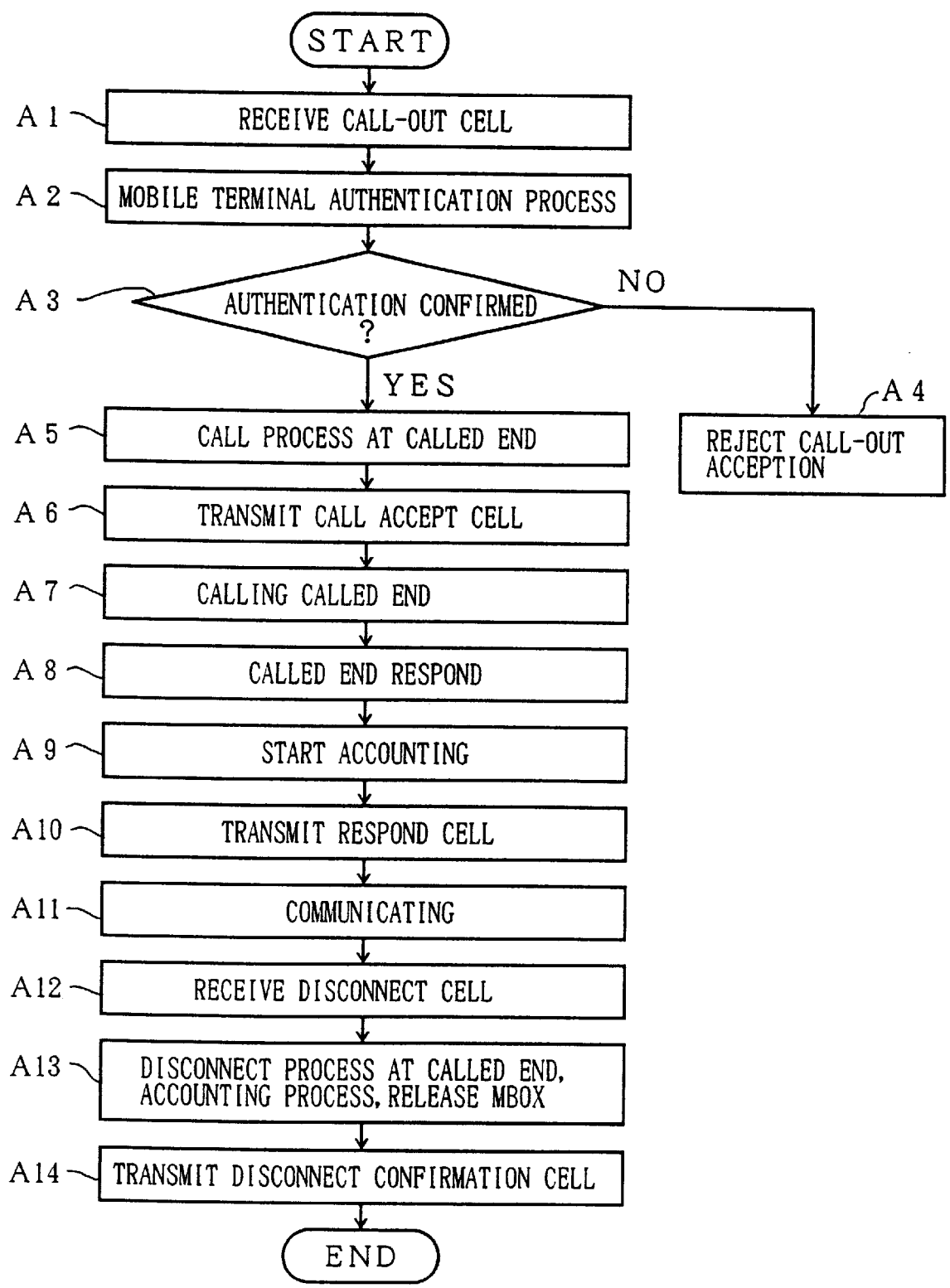
FIG. 12 is a flow chart for explaining a call-out control process of the embodiment of the mobile switching station.

FIG. 12 is a flow chart for explaining a call-out control process of the embodiment of the mobile switching station. When the call-out cell (B) shown in FIG. 8 from the mobile terminal is transferred from the base station to the mobile switching station in a step A1, a step A2 carries out a mobile terminal authentication process in the call controller 32 shown in FIG. 5. A step A3 decides whether or not the authentication is confirmed. If the decision result in the step A3 is NO, a step A4 rejects acceptance of this call-out cell (B).

On the other hand, if the decision result in the step A3 is YES, a step A5 carries out a call process at the called end. In other words, the called number of the information part of the call-out cell (B) is analyzed, and call-out information is transmitted to the general switched network or the like to which the terminal at the called end is accommodated. In addition, a step A6 transmits the call accept cell (C) shown in FIG. 9A with respect to the mobile terminal which made the call-out. In this state, the terminal at the called end is being called in a step A7.

When the called end responds by an off-hook or the like in a step A8, the call controller 32 of the mobile switching station starts an accounting process in a step A9 with respect to the mobile terminal which made the call-out. A step A10 transmits the respond cell (D) shown in FIG. 9B with respect to the mobile terminal which made the call-out. As a result, the mobile terminal and the terminal at the called end assumes a communicating state in a step A11.

When the communication ends and the mobile terminal transmits the disconnect cell (E) shown in FIG. 10A, the call controller 32 receives this disconnect cell (E) in a step A12. A disconnect process at the called end, an accounting process, release of the message box part (MBOX) and the like are carried out in a step A13. The disconnect confirmation cell (F) shown in FIG. 10B is transmitted to the mobile terminal in a step A14.

Figure 13:
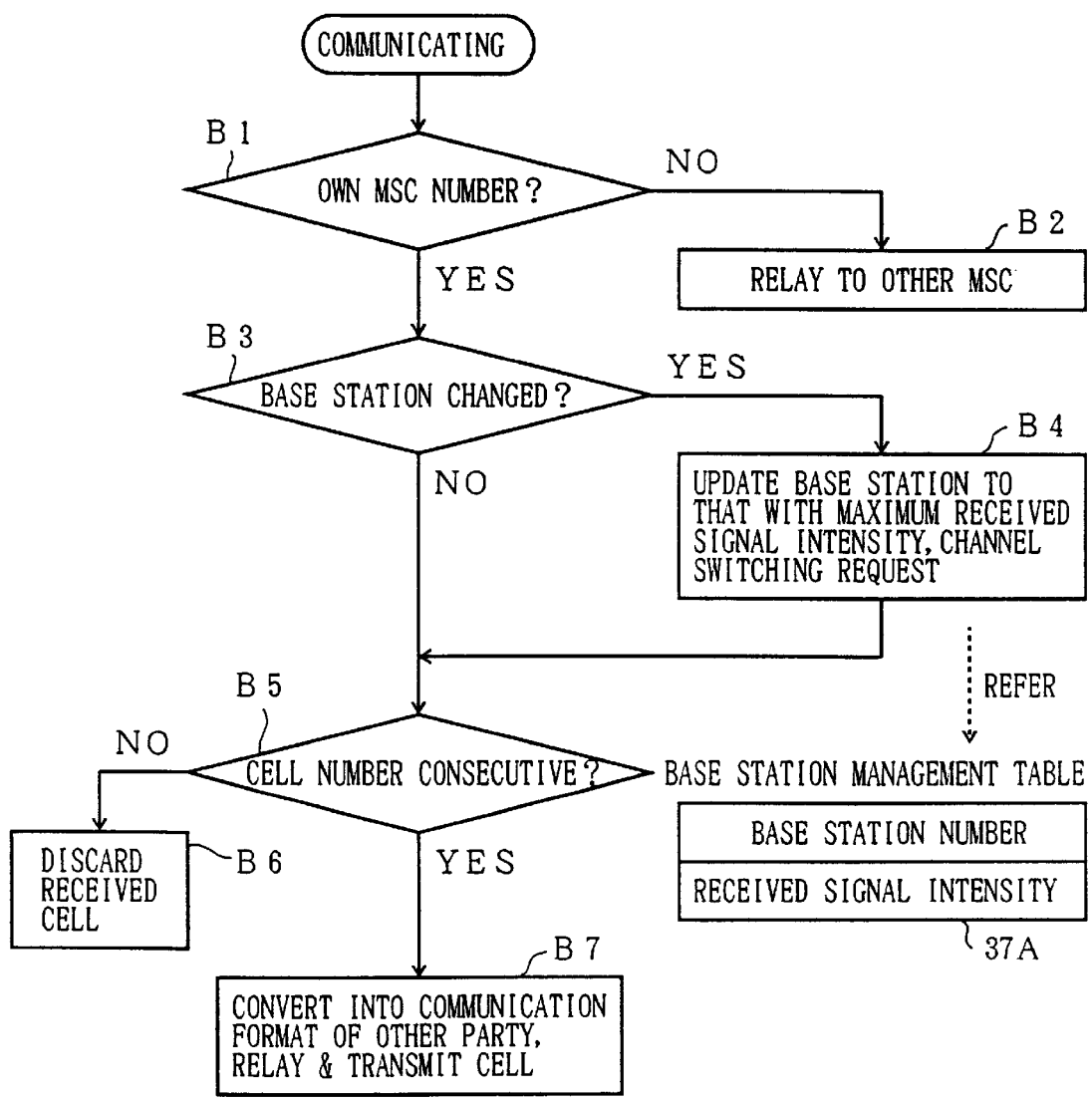
FIG. 13 is a flow chart for explaining a communication cell process of the embodiment of the mobile switching station.

FIG. 13 is a flow chart for explaining a communication cell process of the embodiment of the mobile switching station. A step BE1 decides whether or not the MSC number of the cell header part of a communication cell in communication is the mobile switching station number thereof. If the decision result in the step B1 is NO, the communication cell specifies another mobile switching station, and a step B2 relays and transmits the communication cell to the other mobile switching station. More particularly, since the tag information of the ATM cell (G) shown in FIG. 11 is formed based on the MSC number, with respect to the other mobile switching station, the communication cell is transferred via the network terminating accommodation unit 43 and the network termination unit 45 at the ATM cell switch 31 shown in FIG. 6.

On the other hand, if the decision result in the step B1 is YES, a step B3 decides whether or not the base station is changed. If the decision result in the step B3 is YES, a step B4 refers to a base station management table 37A of the base station manager 37 shown in FIG. 5. The received signal intensities which are recorded in correspondence with the base station numbers in the base station management table 37A is updated by the received signal intensity which is extracted from the cell header part of the ATM cell transferred from the base station. By recording the received signal intensity with respect to the base station in communication in correspondence with the mobile terminal number, it is possible to compare the received signal intensities of two base stations and judge whether or not a difference is greater than or equal to a preset value. In a step B4, the base station number of the cell header part of the ATM cell is updated to the base station number of the base station having the largest received signal intensity if the difference of the two compared received signal intensities is greater than or equal to the preset value, and a communication channel switch request is transmitted with respect to the base station having the largest received signal intensity.

When switching the base station, the mobile switching station copies the ATM cell and adds thereto the base station numbers of the two base stations so as to transmit the ATM cell from the two base stations to the same mobile terminal. The mobile switching station carries out a control, that is, a soft handover, so as to prevent interruption of the communication during the process of switching the base stations.

The cell number judging part 35 of the message box part 33 shown in FIG. 5 judges whether or not the cell number is consecutive, in a step B5. The ATM cells which are obtained from the mobile terminal via a plurality of base stations have the same cell header part, and are transferred to the same message box part. Hence, the duplicated ATM cells do not have consecutive cell numbers. Accordingly, if the decision result in the step B5 is NO, a step B6 discards the received ATM cell which is a duplicate of another. On the other hand, if the decision result in the step B5 is YES, a step B7 converts the format of the received ATM cell into the communication format of the other party, and relays and transmits the ATM cell with the converted format. In other words, when the general switched network carries out the switching process with respect to the PCM audio information, the ATM cells are disassembled and are converted into the PCM audio information.

Figure 14:
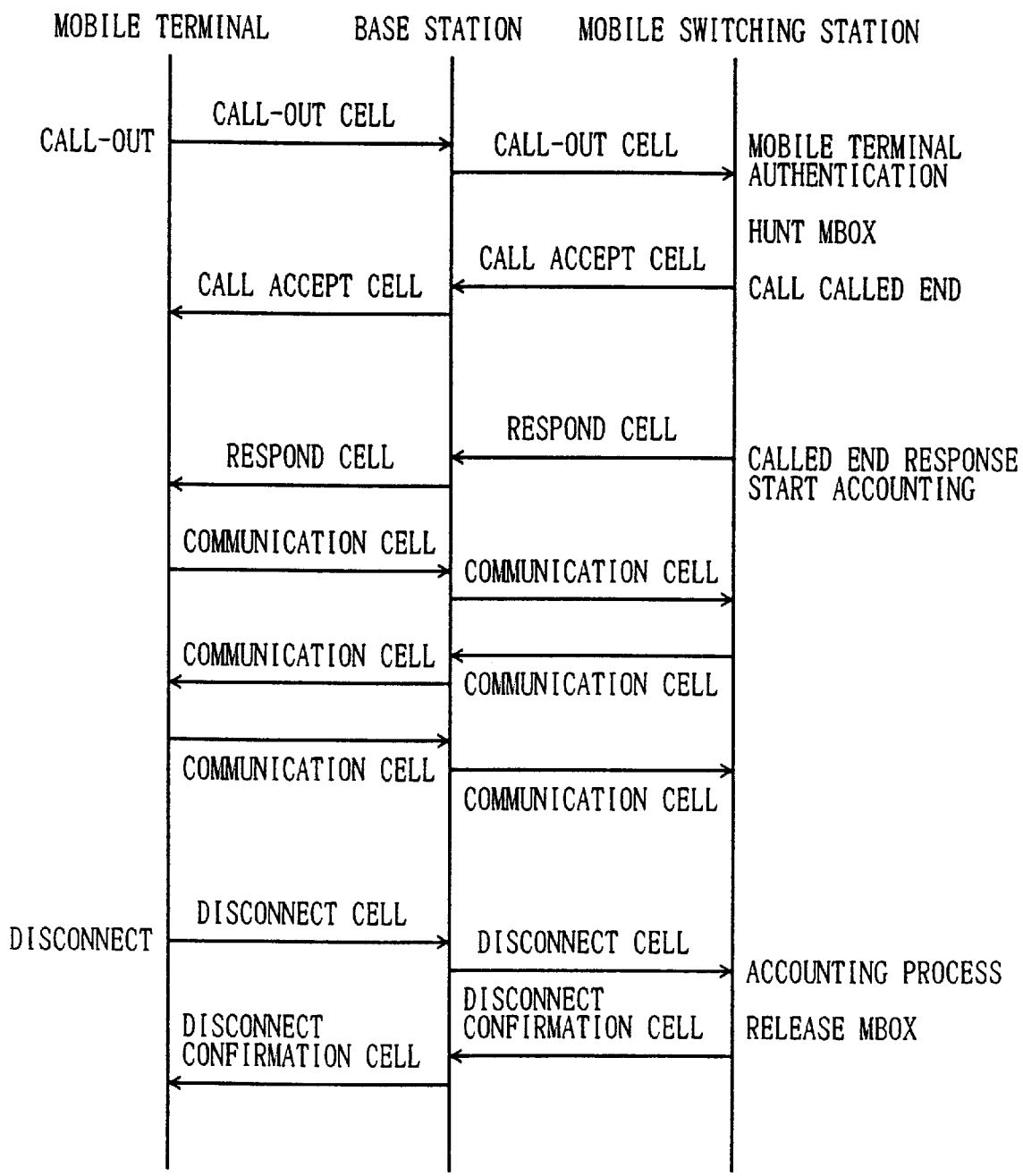
FIG. 14 is a diagram for explaining a call-out sequence of the embodiment.

FIG. 14 is a diagram for explaining a call-out sequence of the embodiment. FIG. 14 shows a case where the mobile terminal makes the call-out. In FIG. 14, the call-out cell (B) shown in FIG. 8 from the mobile terminal is transferred to the mobile switching station via the base station, and the authentication of the mobile terminal is made in the call controller 32 of the mobile switching station shown in FIG. 5. If the authentication of the mobile terminal is confirmed, the message box part 33 is assigned, and the terminal at the called end is called. At the same time, the call accept cell (C) shown in FIG. 9A is transmitted to the mobile terminal which made the call-out, via the base station.

When the terminal at the called end responds to the call, the mobile switching station starts an accounting process. In addition, the mobile switching station transmits the respond cell (D) show in FIG. 9B to the mobile terminal via the base station. The mobile terminal assumes a communication state in response to the respond cell (D), and the communication is made between the mobile terminal and the terminal at the called end by exchanging the communication cells. When the communication ends and the mobile terminal transmits the disconnect cell (E) shown in FIG. 10A, the mobile switching station carries out an accounting process with respect to the mobile terminal which made the call-out, releases the message box part 33, and transmits the disconnect confirmation cell (F) shown in FIG. 10B to the mobile terminal via the base station.

Figure 15:
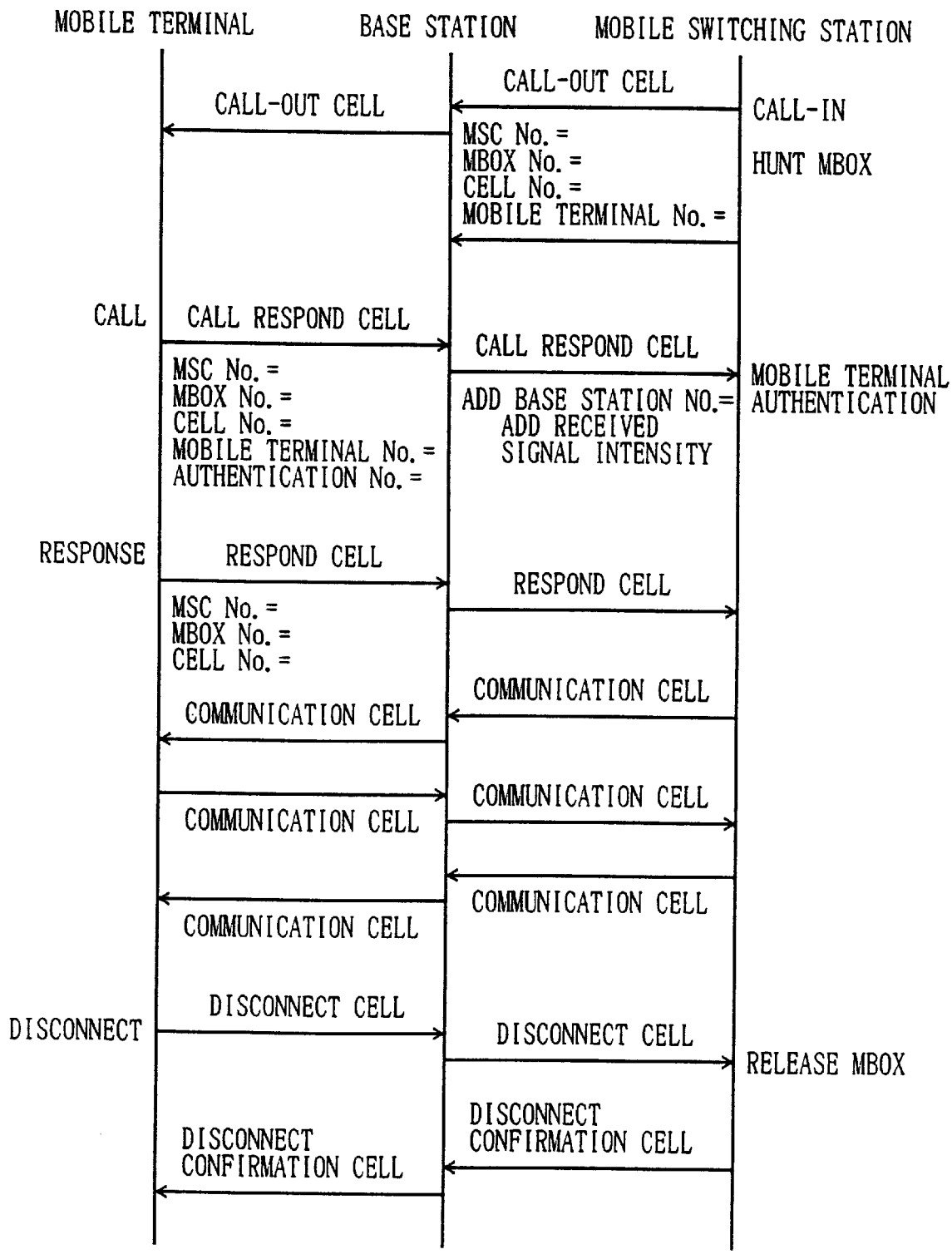
FIG. 15 is a diagram for explaining a call-in sequence of the embodiment.

FIG. 15 is a diagram for explaining a call-in sequence of the embodiment. FIG. 15 shows a case where the mobile terminal is called. In FIG. 15, the mobile switching station refers to a home memory based on the mobile terminal number, and obtains the base stations within the service areas to which the location of the called mobile terminal belongs. In addition, the mobile switching station hunts the message box (MBOX), and forms a calling cell which includes the mobile switching station (MSC) number, the message box (MBOX) number, the cell number and the mobile terminal number, and transmits the calling cell to the mobile terminal via the base station.

The mobile terminal receives the calling cell, and judges from the mobile terminal number whether or not the calling cell is addressed to the mobile terminal. If the calling cell is addressed to the mobile terminal, an accept respond cell is transmitted from the mobile terminal. This accept respond cell includes the mobile switching station number included in the calling cell, the message box number, the mobile terminal number, a new cell number and an authentication number. When the called mobile terminal responds to the call by an off-hook or the like, a respond cell is transmitted from the mobile terminal.

When the base station receives the accept respond cell from the mobile terminal, the base station adds a base station number and a received signal intensity to the accept respond cell, and transfers this accept respond cell to the mobile switching station. Based on the authentication number of the mobile terminal included in the accept respond cell, the mobile switching station judges whether or not a legitimate mobile terminal responded. If the authentication is confirmed, communication cells are exchanged between the mobile switching station and the called mobile terminal in response to the respond cell from the mobile terminal, and the mobile terminal assumes a communication state.

When the communication ends and the mobile terminal transmits a disconnect cell, the mobile switching station releases the message box part and transmits a disconnect confirmation cell. The communication is completed when the mobile terminal receives this disconnect confirmation cell.

Figure 16:
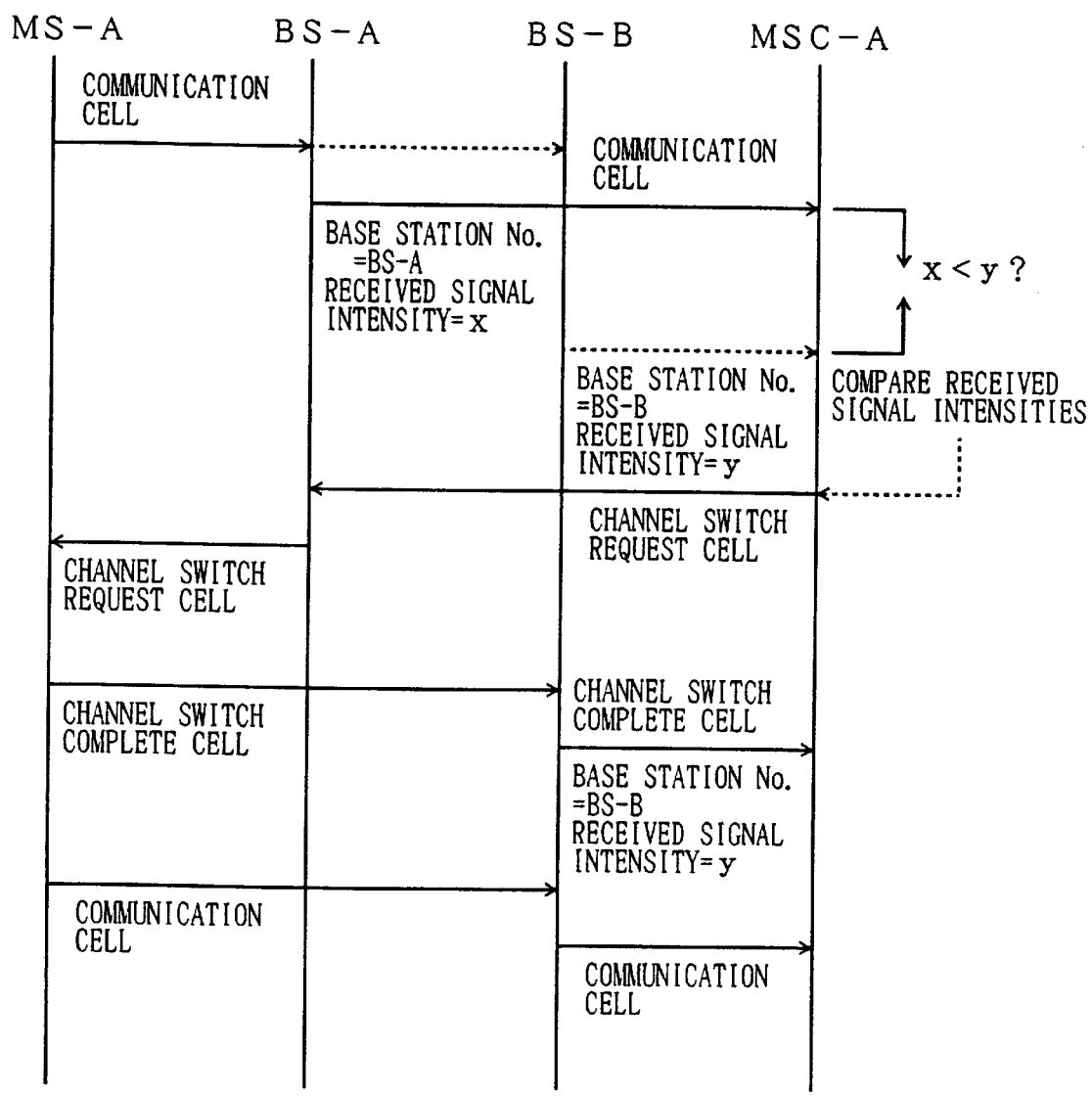
FIG. 16 is a diagram for explaining a channel switching sequence of the embodiment.

FIG. 16 is a diagram for explaining a channel switching sequence of the embodiment. FIG. 166 shows a case where a mobile terminal MS-A, base stations BS-A and BS-B, and a mobile switching station MSC-A are provided, and a switching is made from the base station BS-A to the base station BS-B as the mobile terminal MS-A moves. In other words, the base stations BS-A and BS-B receive the communication cells from the mobile terminal MS-A, and the base station BS-A adds a base station number BS-A and a received signal intensity x to the cell header part of the communication cell, and transfers the communication cells to the mobile switching station MSC-A. In addition, if the received signal intensity of the communication cell from the mobile terminal MS-A exceeds a predetermined threshold value, the base station BS-B adds a base station number BS-B and a received signal intensity y to the cell header part of the communication cell, and transfers the communication cells to the mobile switching station MSC-A.

The mobile switching station MSC-A compares the received signal intensities x and y for the case where the MSC number and the MBOX number of the cell header parts of the communication cells are the same but the base station accommodating MSC number and the base station number of the cell header parts of the communication cells are different. If x>y and the difference between the received signal intensities x and y is greater than or equal to a predetermined value, the mobile switching station MSC-A specifies the mobile terminal MS-A in the base station BS-A, and transmits a channel switch request cell which includes the communication frequency, channel number and the like to be used in the base station BS-B. The base station BS-A transmits this channel switch request cell to the mobile terminal MS-A.

The mobile terminal MS-A carries out a switching process in accordance with the channel switch request cell, and transmits a channel switch complete cell to the base station BS-B. The base station BS-B transmits to the mobile switching station MSC-A a channel switch complete cell having the cell header part added with the base station number BS-B and the received signal intensity y. Hence, a switching process is carried out to switch from the base station BS-A to the base station BS-B with respect to the mobile terminal MS-A. When carrying out this switching process, the switching can be made without interrupting the communication by simultaneously transferring the communication cells via the base stations BS-A and BS-B.

Figure 17:
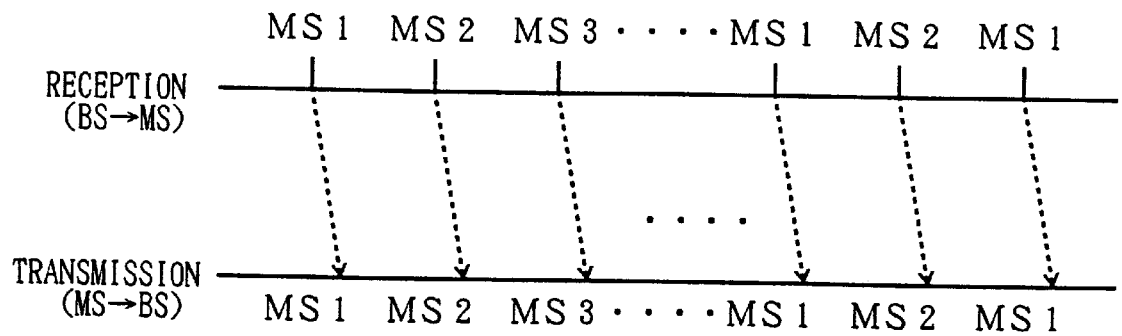
FIG. 17 is a diagram for explaining an embodiment of a method of preventing collisions of cells transmitted from the embodiment of the mobile terminal.

FIG. 17 is a diagram for explaining an embodiment of a method of preventing collisions of cells transmitted from the embodiment of the mobile terminal. FIG. 17 shows the transmitting/receiving timings of the ATM cells between the mobile terminals MS1, MS2, MS3, . . . and the base station BS. In this case, when each of the mobile terminals MS1, MS2, MS3, . . . receives the ATM cell addressed thereto from the base station BS, the ATM cells are transmitted with a transmission timing which is a predetermined time after the reception of the ATM cell. Hence, even when the same communication channel is used, the ATM cells from the mobile terminals MS1, MS2, MS3, . . . can be transmitted to the base station BS without collisions.

Figure 18:
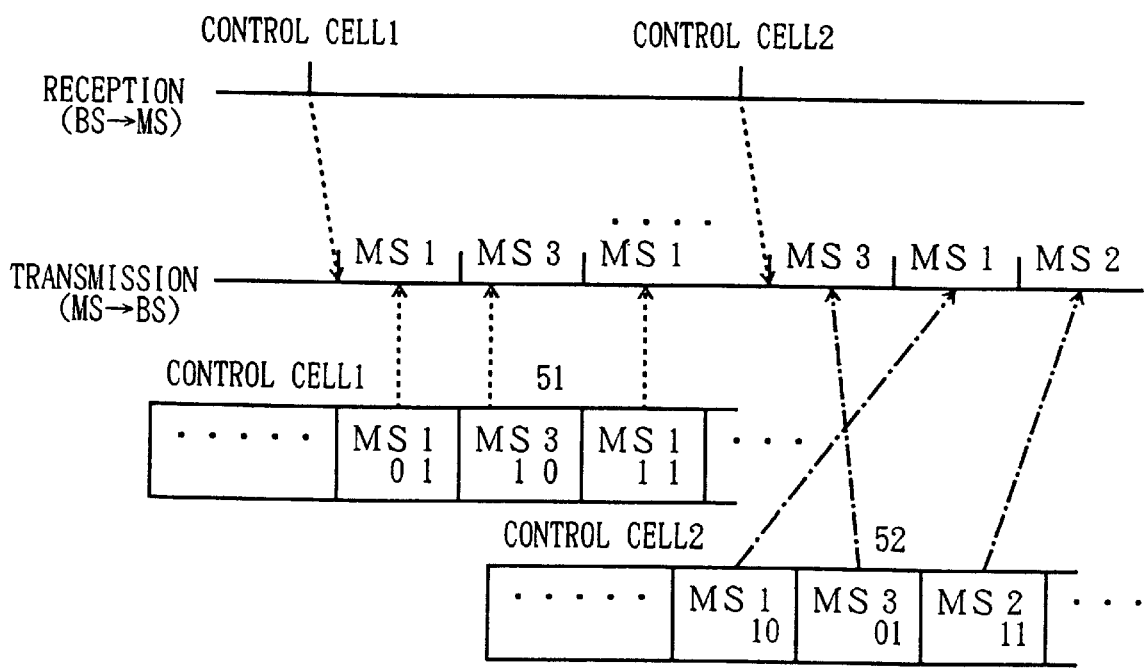
FIG. 18 is a diagram for explaining another embodiment of a method of preventing collisions of cells transmitted from the embodiment of the mobile terminal.

FIG. 18 is a diagram for explaining another embodiment of a method of preventing collisions of cells transmitted from the embodiment of the mobile terminal. FIG. 18 shows a case where the base station BS transmits control cells 1, 2, . . . , and the mobile terminals MS1, MS2, MS3, . . . transmit the ATM cells depending on an order specified by the control cells 1, 2, . . . . For example, the control cell 1 indicates the transmission order as MS1=01, MS2=10, MS3=11, . . . , and the mobile terminals MS1, MS2, MS3, . . . which receive this control cell 1 transmit the ATM cells depending on this order. In addition, the control cell 2 indicates the transmission order as MS1=10, MS2=01, MS3=11, . . . , and the mobile terminals MS2, MS1, MS3, . . . transmit the ATM cells depending on this transmission order.

In the mobile terminal, a cell accumulating part may be provided in the transmitting cell assembling part 12 shown in FIG. 3, so as to accumulate the ATM cells which await transmission. In this case, a priority and an accumulated number of cells are added to a cell header part 53 shown in FIG. 19 of the ATM cell which is transmitted on an up-line from the mobile terminal MS to the base station BS. At the base station BS, an operation (transmission urgency)= (priority)×(accumulated number of cells) based on the priority and the accumulated number of cells, by taking a large priority value as having a high priority, for example. By carrying out this operation, transmission urgencies a, b, . . . , k in correspondence with the mobile terminal numbers of the mobile terminals MS1, MS2, . . . , MSn are updated in a transmission management table 54 shown in FIG. 20. In this case, the transmission urgency becomes higher as the priority value becomes higher or the accumulated number of cells becomes larger. The ATM cell with the high transmission urgency can be specified in the next period or, the transmission timing can be updated for every predetermined period.

The method of preventing the collision of the ATM cells transmitted from the mobile terminal MS is of course not limited to that employed in the embodiment described above, and various other means may be employed. For example, a carrier sense multiple access with collision avoidance (CSMA/CA) may be used, and the collision of the ATM cells can be avoided by controlling the transmission timing of the ATM cells from the mobile terminal. Because the ATM cell has a fixed length and is relatively shot, a delay which is introduced by the collision avoiding process in the above described embodiment is negligibly small. Accordingly, it is possible to maintain a desired communication quality. In addition, the mobile terminal is of course not limited to the communication for speech, but may also be used in communication for data transfer.

Further, the present invention is not limited to these embodiments, but various variations and modifications may be made without departing from the scope of the present invention.

What is claimed is:

1. A mobile communication system comprising:
   a first mobile terminal;
   a first base station;
   a first mobile switching station; and
   a second mobile switching station;
   said first mobile terminal, said base station and said first mobile switching station being constructed so that communication information and control information are transferred by an asynchronous transfer mode (ATM) cell between said first mobile terminal and said first base station, between said first mobile switching station and said first base station;

said first and second mobile switching stations being constructed so that the communication information and the control information are transferred by the ATM cell between said first and second mobile switching stations, wherein said second mobile switching station is specified by a mobile switching station number in a cell header part of the ATM cell in said first mobile switching station, the ATM cell is transferred between said first and second mobile switching stations which are mutually specified, and said first mobile terminal communicates with a second mobile terminal via said first base station and a second base station which are coupled to said first and second mobile switching stations, mutually different.

2. A mobile terminal for use in a mobile communication system including mobile terminals, base stations and mobile switching stations, said mobile terminal comprising:

a radio transmitter/receiver part transmitting and receiving an asynchronous transfer mode (ATM) cell;

an audio input/output part inputting and outputting audio information;

a transmitting cell assembling part assembling the ATM cell from the audio information output from said audio input/output part and control information, and transferring the ATM cell to said radio transmitter/receiver part;

a received cell disassembling part disassembling the ATM cell received by said radio transmitter/receiver part to restore audio information, and transferring the restored audio information to said audio input/output part; and a control processor controlling assembling and disassembling of the ATM cell in said transmitting cell assembling part and said received cell disassembling part, and controlling a transmission timing of the ATM cell from said radio transmitter/receiver, wherein said transmitting cell assembling part includes a cell accumulating part accumulating ATM cells which await transmission, said control processor controls said transmitting cell assembling part to notify the base station of a number of accumulated ATM cells which await transmission in the cell accumulating part, and said control processor controls said radio transmitter/receiver part to transmit the ATM cell with a transmission timing which is notified from the base station in correspondence with said number of accumulated ATM cells.

3. The mobile terminal as claimed in claim 2, wherein said transmitting cell assembling part adds a cell number which indicates a transmitting order to a cell header part of the ATM cell.

4. The mobile terminal as claimed in claim 2, wherein said control processor determines the transmission timing to a timing which is a predetermined time after a reception timing of the ATM cell by said radio transmitter/receiver part from the base station.

5. A mobile communication control method which controls communication in a mobile communication system including mobile terminals, base stations and mobile switching stations, said mobile communication control method comprising:

transferring call control information and audio information by the ATM cells between the base stations and the mobile switching stations respectively;

switching the ATM cells in the mobile switching stations depending on tag information in a respective cell header part of the ATM cells, said tag information indicating a structure of a corresponding one of the mobile switching stations the steps of:

receiving the respective ATM cells from the mobile terminals by a plurality of base stations and transferring the ATM cells from the base stations to the mobile switching stations;

comparing, in the respective mobile switching stations, received signal intensities in the cell header parts of the ATM cells received from the base stations;

switching the base stations from one base station to another base station having a larger received signal intensity;

instructing the mobile terminals to switch a communication channel from one base station to said other base station; and comparing, in the mobile switching stations, cell numbers of the ATM cells which are received from the mobile terminal via the base stations, and discarding duplicates of the ATM cells having the same cell number.

6. The mobile communication control method as claimed in claim 5, which further comprises the steps of:

controlling timings from the base stations so that a plurality of mobile terminals using the same communication channel within a service area of the base stations transmits the ATM cells at different transmission timings.

7. The mobile communication control method as claimed in claim 5, which further comprises the steps of:

setting, in the mobile terminals, a transmission timing of the respective ATM cells based on a reception timing of the ATM cells from the base stations respectively.

8. The mobile communication control method as claimed in claim 5, which further comprises the steps of:

specifying, in the base stations, a transmission timing of the ATM cells transmitted from the mobile terminals which use the same communication channel within a service area of the base stations, by a control ATM cell including control information.

9. The mobile communication control method as claimed in claim 5, further comprising the step of:

transferring the call control information and the audio information between the mobile terminals and the base stations by ATM cells respectively via a radio channel.

10. A mobile communication control method which controls communication in a mobile communication system including mobile terminals, base stations and mobile switching stations, said mobile communication control method comprising the steps of:

transferring call control information and audio information by the ATM cells between the base stations and the mobile switching stations respectively;

switching the ATM cells in the mobile switching stations depending on tag information in a respective cell header part of the ATM cells, said tag information indicating a structure of a corresponding one of the mobile switching stations;

specifying, in the base stations, a transmission timing of the ATM cells transmitted from the mobile terminals which use the same communication channel within a service area of the base stations, by a control ATM cell including control information;

notifying an accumulated number of ATM cells to be transmitted from the mobile terminals to the base stations by the ATM cells; and setting, in the base stations, an order of transmission timings of the ATM cells to be transmitted from the mobile terminals based on the accumulated number of ATM cells.

11. A mobile communication control method which controls communication in a mobile communication system including mobile terminals, base stations and mobile switching stations, said mobile communication control method comprising the steps of:

transferring call control information and audio information by the ATM cells between the base stations and the mobile switching stations respectively;

switching the ATM cells in the mobile switching stations depending on tag information in a respective cell header part of the ATM cells, said tag information indicating a structure of a corresponding one of the mobile switching stations;

notifying an accumulated number of ATM cells to be transmitted from the mobile terminals to the base stations by the ATM cells; and setting, in the base stations, an order of transmission timings of the ATM cells to be transmitted from the mobile terminals based on the accumulated number of ATM cells.

* * * * *